US011372151B2

(12) United States Patent
Xu et al.

(10) Patent No.: US 11,372,151 B2
(45) Date of Patent: Jun. 28, 2022

(54) ILLUMINATED DEVICE ENCLOSURE WITH DYNAMIC TRACKPAD COMPRISING TRANSLUCENT LAYERS WITH LIGHT EMITTING ELEMENTS

(71) Applicant: Apple Inc., Cupertino, CA (US)

(72) Inventors: Qiliang Xu, Livermore, CA (US); Dinesh C. Mathew, San Francisco, CA (US); Adam T. Garelli, Santa Clara, CA (US); Richard G. Huizar, Sunnyvale, CA (US); Genie Kim, Sejong (KR); Robert J. Lockwood, San Carlos, CA (US); Robert Y. Cao, San Francisco, CA (US)

(73) Assignee: Apple Inc, Cupertino, CA (US)

( * ) Notice: Subject to any disclaimer, the term of this patent is extended or adjusted under 35 U.S.C. 154(b) by 0 days.

(21) Appl. No.: 16/919,425

(22) Filed: Jul. 2, 2020

(65) Prior Publication Data

US 2020/0333853 A1 Oct. 22, 2020

Related U.S. Application Data

(63) Continuation of application No. 15/965,840, filed on Apr. 27, 2018, now Pat. No. 10,732,676.
(Continued)

(51) Int. Cl.
*F21V 8/00* (2006.01)
*G06F 1/16* (2006.01)
(Continued)

(52) U.S. Cl.
CPC ......... *G02B 6/0038* (2013.01); *G02B 6/0068* (2013.01); *G02B 6/0076* (2013.01);
(Continued)

(58) Field of Classification Search
CPC ...... G06F 1/1673; G06F 1/163; G06F 1/1616; G06F 1/1692; G06F 1/169; G06F 1/1637;
(Continued)

(56) References Cited

U.S. PATENT DOCUMENTS

| 5,212,356 A | 5/1993 | English |
| 5,541,372 A | 7/1996 | Baller |

(Continued)

FOREIGN PATENT DOCUMENTS

| CN | 1862732 | 11/2006 |
| CN | 101071354 | 11/2007 |

(Continued)

OTHER PUBLICATIONS

Rekimoto, Jun, "Thumbsense: Automatic Input Mode Sensing for Touch-Based Interactions," Interaction Laboratory, Sony Computer & Science Laboratories, Inc., 2 pages, Apr. 2003.

*Primary Examiner* — Darlene M Ritchie
(74) *Attorney, Agent, or Firm* — Brownstein Hyatt Farber Schreck, LLP

(57) ABSTRACT

Embodiments are directed to an electronic device having an illuminated body that defines a virtual or dynamic trackpad. The electronic device includes a translucent layer defining a keyboard region and a dynamic input region along an external surface. A keyboard may be positioned within the keyboard region and including a key surface and a switch element (e.g., to detect a keypress). A light control layer positioned below the translucent layer and within the dynamic input region may have a group of illuminable features. The electronic device may also include a group of light-emitting elements positioned below the optical diffuser. One or more of the light control layer or the group of light-emitting elements may be configured to illuminate the dynamic input region to display a visible boundary of an
(Continued)

active input area. At least one of a size or a position of the visible boundary may be dynamically variable.

18 Claims, 29 Drawing Sheets

Related U.S. Application Data

(60) Provisional application No. 62/555,027, filed on Sep. 6, 2017.

(51) Int. Cl.
| | |
|---|---|
| *G06F 3/0354* | (2013.01) |
| *G06F 3/02* | (2006.01) |
| *G06F 3/01* | (2006.01) |
| *G06F 3/0488* | (2013.01) |
| *G04G 21/00* | (2010.01) |
| *G06F 3/044* | (2006.01) |
| *H01H 13/14* | (2006.01) |
| *H01H 13/20* | (2006.01) |
| *G06F 3/041* | (2006.01) |
| *G06F 3/04883* | (2022.01) |
| *G06F 3/04886* | (2022.01) |

(52) U.S. Cl.
CPC .............. *G04G 21/00* (2013.01); *G06F 1/163* (2013.01); *G06F 1/169* (2013.01); *G06F 1/1616* (2013.01); *G06F 1/1637* (2013.01); *G06F 1/1656* (2013.01); *G06F 1/1673* (2013.01); *G06F 1/1692* (2013.01); *G06F 3/016* (2013.01); *G06F 3/02* (2013.01); *G06F 3/03545* (2013.01); *G06F 3/03547* (2013.01); *G06F 3/04883* (2013.01); *G06F 3/04886* (2013.01); *G06F 3/041* (2013.01); *G06F 3/044* (2013.01); *G06F 3/0414* (2013.01); *H01H 13/14* (2013.01); *H01H 13/20* (2013.01); *H01H 2233/07* (2013.01)

(58) Field of Classification Search
CPC ............... G06F 1/1656; G06F 3/03545; G06F 3/04886; G06F 3/016; G06F 3/03547; G06F 3/044; G06F 3/02; G06F 3/04; G06F 3/041; G06F 3/0412; G06F 3/0414; G06F 3/04144; G06F 3/0447; G02B 6/0076; G02B 6/0038; G02B 6/0068; G04G 21/00; H01H 13/20; H01H 13/14; H01H 2233/07
See application file for complete search history.

(56) References Cited

U.S. PATENT DOCUMENTS

| | | |
|---|---|---|
| 5,748,177 A | 5/1998 | Baker et al. |
| 5,920,303 A | 7/1999 | Baker et al. |
| 6,029,214 A | 2/2000 | Dorfman et al. |
| 6,429,846 B2 | 8/2002 | Rosenberg et al. |
| 6,585,435 B2 | 7/2003 | Fang |
| 6,757,002 B1 | 6/2004 | Cross |
| 6,822,640 B2 | 11/2004 | Derocher |
| 7,339,577 B2 | 3/2008 | Sato |
| 7,364,337 B2 | 4/2008 | Park |
| 7,364,339 B2 | 4/2008 | Park |
| 7,538,760 B2 | 5/2009 | Hotelling |
| 7,683,890 B2 | 3/2010 | Geaghan |
| 7,834,855 B2 | 11/2010 | Hotelling et al. |
| 7,839,379 B1 | 11/2010 | Kerr |
| 7,843,438 B2 | 11/2010 | Onoda |
| 7,847,789 B2 | 12/2010 | Kolmykov-Zotov et al. |
| 7,884,315 B2 | 2/2011 | Andre et al. |
| 7,893,921 B2 | 2/2011 | Sato |
| 7,901,991 B2 | 3/2011 | Bonucci et al. |
| 7,999,792 B2 | 8/2011 | Tsuji |
| 8,022,942 B2 | 9/2011 | Bathiche |
| 8,063,893 B2 | 11/2011 | Rosenberg et al. |
| 8,077,057 B2 | 12/2011 | Ohshita et al. |
| 8,098,233 B2 | 1/2012 | Hotelling et al. |
| 8,172,444 B2 | 5/2012 | Chan et al. |
| 8,232,976 B2 | 7/2012 | Yun et al. |
| 8,321,810 B2 | 11/2012 | Heintze |
| 8,330,725 B2 | 12/2012 | Mahowald |
| 8,334,794 B2 | 12/2012 | Watanabe |
| 8,335,996 B2 | 12/2012 | Davidson et al. |
| 8,378,975 B2 | 2/2013 | Yoon et al. |
| 8,381,118 B2 | 2/2013 | Minton |
| 8,390,481 B2 | 3/2013 | Pance et al. |
| 8,432,362 B2 | 4/2013 | Cheng et al. |
| 8,436,816 B2 | 5/2013 | Leung et al. |
| 8,441,790 B2 | 5/2013 | Pance et al. |
| 8,502,800 B1 | 8/2013 | Vier et al. |
| 8,537,132 B2 | 9/2013 | Ng et al. |
| 8,537,140 B2 | 9/2013 | Tsai et al. |
| 8,570,280 B2 | 10/2013 | Stewart et al. |
| 8,576,182 B2 | 11/2013 | Hristov |
| 8,592,699 B2 | 11/2013 | Kessler |
| 8,599,141 B2 | 12/2013 | Soma |
| 8,642,908 B2 | 2/2014 | Moran et al. |
| 8,654,524 B2 | 2/2014 | Pance et al. |
| 8,686,952 B2 | 4/2014 | Burrough et al. |
| 8,723,824 B2 | 5/2014 | Myers |
| 8,743,083 B2 | 6/2014 | Zanone et al. |
| 8,749,523 B2 | 6/2014 | Pance et al. |
| 8,766,922 B2 | 7/2014 | Kim et al. |
| 8,782,556 B2 | 7/2014 | Badger et al. |
| 8,786,568 B2 | 7/2014 | Leung et al. |
| 8,804,347 B2 | 8/2014 | Martisauskas |
| 8,854,325 B2 | 10/2014 | Byrd et al. |
| 8,859,923 B2 | 10/2014 | Obata |
| 8,870,812 B2 | 10/2014 | Alberti et al. |
| 8,952,899 B2 | 2/2015 | Hotelling |
| 8,960,934 B2 | 2/2015 | Sung |
| 8,963,846 B2 | 2/2015 | Lii et al. |
| 9,019,207 B1 | 4/2015 | Hamburgen et al. |
| 9,019,710 B2 | 4/2015 | Jeziorek |
| 9,028,123 B2 | 5/2015 | Nichol et al. |
| 9,063,627 B2 | 6/2015 | Yairi et al. |
| 9,098,120 B2 | 8/2015 | Huh |
| 9,098,244 B2 | 8/2015 | Roskind |
| 9,104,282 B2 | 8/2015 | Ichikawa |
| 9,116,616 B2 | 8/2015 | Kyprianou et al. |
| 9,122,330 B2 | 9/2015 | Bau et al. |
| 9,195,354 B2 | 9/2015 | Bulea et al. |
| 9,201,105 B2 | 12/2015 | Iida et al. |
| 9,213,426 B2 | 12/2015 | Clifton et al. |
| 9,223,352 B2 | 12/2015 | Smith et al. |
| 9,244,490 B2 | 1/2016 | Park |
| 9,250,738 B2 | 2/2016 | Sharma |
| 9,304,599 B2 | 4/2016 | Walline |
| 9,317,140 B2 | 4/2016 | Rosenfeld |
| 9,367,146 B2 | 6/2016 | Piot et al. |
| 9,367,158 B2 | 6/2016 | Hotelling et al. |
| 9,400,579 B2 | 7/2016 | Leung et al. |
| 9,448,628 B2 | 9/2016 | Tan et al. |
| 9,460,029 B2 | 10/2016 | Shaw et al. |
| 9,542,097 B2 | 1/2017 | Ganey et al. |
| 9,543,948 B2 | 1/2017 | Curtis et al. |
| 9,575,587 B2 | 2/2017 | O'Keeffe |
| 9,635,267 B2 | 4/2017 | Lee et al. |
| 9,640,347 B2 | 5/2017 | Kwan |
| 9,753,569 B2 | 9/2017 | Han et al. |
| 9,811,221 B2 | 11/2017 | Hayashi |
| 9,847,505 B2 | 12/2017 | Chida |
| 9,908,310 B2 | 3/2018 | Niu |
| 9,917,282 B2 | 3/2018 | Chida |
| 9,927,895 B2 | 3/2018 | Ligtenberg |
| 10,067,628 B2 | 9/2018 | Kuscher et al. |
| 10,098,198 B2 | 10/2018 | Huebner et al. |
| 10,114,485 B2 | 10/2018 | Su |
| 10,146,383 B2 | 12/2018 | Leung et al. |

(56) References Cited

U.S. PATENT DOCUMENTS

| | | | |
|---|---|---|---|
| 10,198,110 B2 | 2/2019 | Suwald et al. | |
| 10,203,767 B2 | 2/2019 | Wackers et al. | |
| 10,241,255 B2 | 3/2019 | Zha | |
| 10,254,853 B2 | 4/2019 | Silvanto et al. | |
| 10,318,065 B2 | 6/2019 | Peterson et al. | |
| 10,409,412 B1 | 9/2019 | Andre et al. | |
| 10,656,719 B2 | 5/2020 | Degner et al. | |
| 10,871,860 B1 | 12/2020 | Bushnell et al. | |
| 10,908,350 B2* | 2/2021 | Vasylyev | G02B 6/0076 |
| 10,942,580 B2 | 3/2021 | Zhang | |
| 2004/0104894 A1 | 6/2004 | Tsukada et al. | |
| 2004/0257345 A1 | 12/2004 | Makanae et al. | |
| 2006/0109258 A1 | 5/2006 | Takisawa | |
| 2006/0197753 A1 | 9/2006 | Hotelling | |
| 2007/0076859 A1 | 4/2007 | Tzvetanov | |
| 2007/0236462 A1 | 10/2007 | Morris et al. | |
| 2008/0018611 A1 | 1/2008 | Serban et al. | |
| 2008/0055259 A1 | 3/2008 | Plocher et al. | |
| 2008/0100568 A1 | 5/2008 | Koch et al. | |
| 2008/0117635 A1* | 5/2008 | Chen | H01H 13/83 |
| | | | 362/311.06 |
| 2008/0150903 A1 | 6/2008 | Chuang | |
| 2008/0180654 A1* | 7/2008 | Bathiche | G06F 3/0238 |
| | | | 356/51 |
| 2008/0272927 A1 | 11/2008 | Woolley et al. | |
| 2009/0128495 A1 | 5/2009 | Kong | |
| 2009/0128496 A1 | 5/2009 | Huang et al. | |
| 2009/0174663 A1 | 7/2009 | Rudd | |
| 2009/0180282 A1* | 7/2009 | Aylward | G02B 6/0021 |
| | | | 362/245 |
| 2009/0219734 A1* | 9/2009 | Sawada | G02B 6/0076 |
| | | | 362/616 |
| 2009/0225052 A1 | 9/2009 | Liu | |
| 2009/0284465 A1 | 11/2009 | Oki | |
| 2010/0033354 A1 | 2/2010 | Ejlersen | |
| 2010/0134431 A1* | 6/2010 | Tsai | G06F 3/0416 |
| | | | 345/173 |
| 2010/0265183 A1 | 10/2010 | Mail et al. | |
| 2010/0271315 A1 | 10/2010 | Bathiche | |
| 2010/0283741 A1 | 11/2010 | Heintze et al. | |
| 2011/0001706 A1 | 1/2011 | Sanford | |
| 2011/0069021 A1 | 3/2011 | Hill | |
| 2011/0100568 A1 | 5/2011 | Kao et al. | |
| 2011/0298716 A1* | 12/2011 | Mahowald | H01H 13/83 |
| | | | 345/168 |
| 2012/0001852 A1 | 1/2012 | Ho et al. | |
| 2012/0050646 A1 | 3/2012 | Huang | |
| 2012/0068933 A1 | 3/2012 | Larsen | |
| 2012/0212443 A1 | 8/2012 | Tomimori | |
| 2013/0002534 A1 | 1/2013 | Braun et al. | |
| 2013/0002573 A1 | 1/2013 | Baba | |
| 2013/0021256 A1 | 1/2013 | Manzen | |
| 2013/0215122 A1 | 8/2013 | McCollum | |
| 2013/0335329 A1 | 12/2013 | Freund | |
| 2014/0015755 A1 | 1/2014 | Hao | |
| 2014/0043289 A1 | 2/2014 | Stern et al. | |
| 2014/0208262 A1 | 7/2014 | Huang | |
| 2014/0317564 A1 | 10/2014 | Odell et al. | |
| 2014/0347312 A1 | 11/2014 | Siska | |
| 2014/0368455 A1 | 12/2014 | Croisonnier et al. | |
| 2015/0123906 A1 | 5/2015 | Mehandjiysky et al. | |
| 2015/0123907 A1 | 5/2015 | Aoki | |
| 2015/0136573 A1 | 5/2015 | Peterson et al. | |
| 2015/0205417 A1 | 7/2015 | Yairi et al. | |
| 2015/0223328 A1 | 8/2015 | Endoh et al. | |
| 2015/0293592 A1 | 10/2015 | Cheong et al. | |
| 2015/0297145 A1 | 10/2015 | Luna et al. | |
| 2015/0309589 A1 | 10/2015 | Chang | |
| 2016/0049266 A1 | 2/2016 | Stringer et al. | |
| 2016/0098107 A1 | 4/2016 | Morrell et al. | |
| 2016/0147440 A1 | 5/2016 | Leyon | |
| 2016/0231856 A1 | 8/2016 | Suwald et al. | |
| 2017/0090594 A1 | 3/2017 | Silvanto et al. | |
| 2017/0090596 A1 | 3/2017 | Silvanto et al. | |
| 2017/0090597 A1 | 3/2017 | Silvanto et al. | |
| 2017/0090654 A1 | 3/2017 | Silvanto et al. | |
| 2017/0249072 A1 | 8/2017 | Martin et al. | |
| 2017/0315622 A1 | 11/2017 | Morrell et al. | |
| 2018/0011548 A1 | 1/2018 | Garelli | |
| 2018/0039351 A1 | 2/2018 | Zhu et al. | |
| 2018/0039376 A1 | 2/2018 | Peterson et al. | |
| 2019/0025954 A1 | 1/2019 | Wang et al. | |
| 2019/0073003 A1 | 3/2019 | Xu et al. | |
| 2020/0257375 A1 | 8/2020 | Degner et al. | |
| 2021/0200385 A1 | 7/2021 | Morrell et al. | |

FOREIGN PATENT DOCUMENTS

| | | |
|---|---|---|
| CN | 101482785 | 7/2009 |
| CN | 101609383 | 12/2009 |
| CN | 101644979 | 2/2010 |
| CN | 101675410 | 3/2010 |
| CN | 201563116 | 8/2010 |
| CN | 102171632 | 8/2011 |
| CN | 102200861 | 9/2011 |
| CN | 202166970 | 3/2012 |
| CN | 102844729 | 12/2012 |
| CN | 103164102 | 6/2013 |
| CN | 103176691 | 6/2013 |
| CN | 203260010 | 10/2013 |
| CN | 103384871 | 11/2013 |
| CN | 103425396 | 12/2013 |
| CN | 103455205 | 12/2013 |
| CN | 103577008 | 2/2014 |
| CN | 103914196 | 7/2014 |
| CN | 104423740 | 3/2015 |
| CN | 104834419 | 8/2015 |
| CN | 104915002 | 9/2015 |
| CN | 205038595 | 2/2016 |
| CN | 206147528 | 5/2017 |
| EP | 0189590 | 6/1986 |
| EP | 2305506 | 4/2011 |
| EP | 2664980 | 11/2013 |
| FR | 2980004 | 3/2013 |
| JP | 2001175415 | 6/2001 |
| TW | 200912612 | 3/2009 |
| TW | 201419112 | 5/2014 |
| WO | WO 97/018528 | 5/1997 |
| WO | WO 07/032949 | 3/2007 |
| WO | WO 11/156447 | 12/2011 |
| WO | WO 11/159519 | 12/2011 |
| WO | WO 14/124173 | 8/2014 |
| WO | WO 14/164628 | 10/2014 |

* cited by examiner

ILLUMINATED DEVICE ENCLOSURE WITH DYNAMIC TRACKPAD COMPRISING TRANSLUCENT LAYERS WITH LIGHT EMITTING ELEMENTS

CROSS-REFERENCE TO RELATED APPLICATION(S)

This application is a continuation of U.S. patent application Ser. No. 15/965,840, filed Apr. 27, 2018, which is a nonprovisional patent application of and claims the benefit of U.S. Provisional Patent Application No. 62/555,027, filed Sep. 6, 2017 and titled "Illuminated Device Enclosure with Dynamic Trackpad," the contents of which are incorporated herein by reference as if fully disclosed herein.

FIELD

The described embodiments relate generally to input surfaces of an electronic device. More particularly, the present embodiments relate to an illuminated electronic device enclosure or body that defines an input surface.

BACKGROUND

In computing systems, an input device may be employed to receive input from a user. Some traditional input devices include large buttons, keys, or other mechanically-actuated structures. However, these types of input devices may lack flexibility or adaptability and may permanently indicate the presence of the input device within the computing system.

SUMMARY

Embodiments of the present invention are directed to an electronic device having an illuminated enclosure that defines a dynamic input surface.

In a first aspect, the present disclosure includes an electronic device. The electronic device includes an upper portion. The upper portion includes an upper enclosure defining an opening. The upper portion further includes a display positioned at least partially within the opening and configured to depict a graphical output. The electronic device further includes a lower portion pivotally coupled with the upper portion. The lower portion includes a lower enclosure having a translucent layer that defines an active input area and an array of light-extraction features positioned within the active input area. The lower portion further includes a keyboard positioned along an upper surface of the lower enclosure and configured to receive a keypress. The lower portion further includes a light-emitting element positioned along a side of the translucent layer and configured to propagate light through the translucent layer to the light-extraction features to illuminate the active input area. The lower portion further includes a processing unit configured to modify the graphical output in response to the keypress and modify the graphical output in response to an input received along the active input area when the active input area is illuminated.

In a second aspect, the present disclosure includes an electronic device. The electronic device includes a translucent layer defining a keyboard region and a dynamic input region along an external surface of the electronic device. The electronic device further includes a keyboard positioned within the keyboard region. The keyboard includes a key surface and a switch element configured to detect a keypress. The electronic device further includes a light control layer positioned below the translucent layer within the dynamic input region and having a group of illuminable features. The electronic device further includes an optical diffuser positioned below the light control layer. The electronic device further includes a group of light-emitting elements positioned below the optical diffuser and configured to propagate light through the optical diffuser, the light control layer, and the translucent layer. One or more of the light control layer or the group of light-emitting elements may be configured to illuminate the dynamic input region to display a visible boundary of an active input area. At least one of a size or a position of the visible boundary may be dynamically variable.

In a third aspect, the present disclosure includes an electronic device. The electronic device includes an enclosure. The electronic device further includes a display positioned at least partially within the enclosure. The electronic device further includes a keyboard positioned along an upper surface of the enclosure. The electronic device further includes a translucent layer defining a dynamic input region along a side of the keyboard. The dynamic input region may have an active input area that is designated by a visual boundary. The electronic device further includes a group of light-emitting elements optically coupled with the translucent layer and configured to depict a visual output within the dynamic input region. The electronic device further includes a sensing element positioned within an interior volume of the enclosure and configured to detect an input along the active input area when the visual boundary is illuminated.

In addition to the exemplary aspect and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1A:
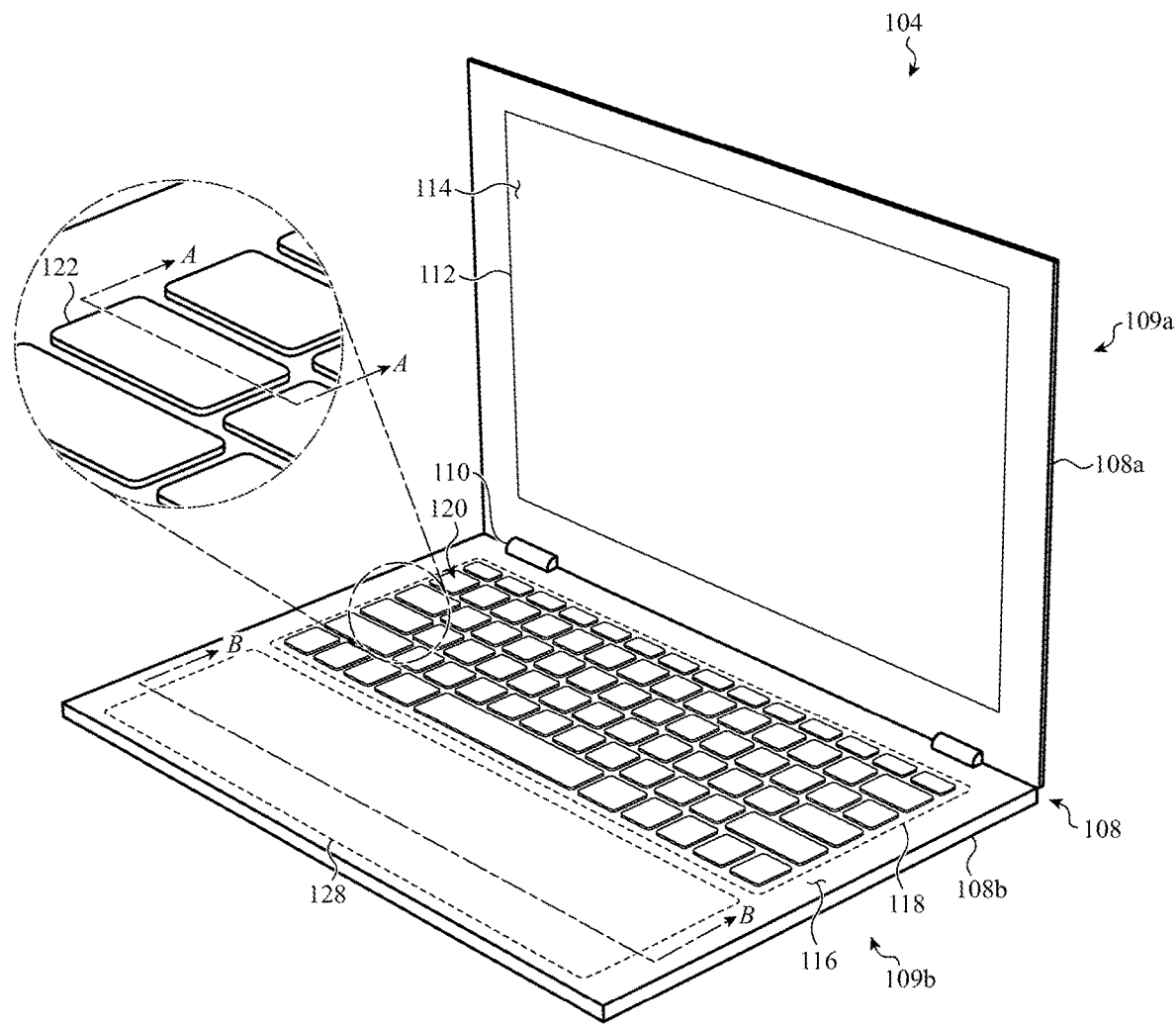
FIG. 1A depicts a sample electronic device including a dynamic input region.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to an electronic device having an illuminated enclosure or body that defines a dynamic input region. The dynamic input region may be defined along an exterior or upper surface of the enclosure formed from a translucent layer or structure. The translucent layer may be selectively illuminated to reveal a customizable active input area (e.g., a virtual track pad) and/or display various visual outputs along the dynamic input region.

Visual output may be produced along the translucent layer using a number of different techniques. In a first example, the translucent layer may be illuminated from the side by a light-emitting element. Light is directed toward light-extraction features in the translucent layer that may illuminate a visible boundary of the active input area (e.g., a virtual trackpad). In another example, the translucent layer is illuminated from below by an array of light-emitting elements (or a single light-emitting element) to create a configurable or customizable boundary of the active input area. For example, the active input area may be moved, resized, rearranged, functionally reassigned, or the like along the dynamic input region. The dynamic input region may also depict various other visual outputs or other optical effects, including illuminating a boundary of a touch input, or conveying other information, including dynamic or updateable information of the electronic device. As described herein, the virtual trackpad may be positioned along a side of a keyboard or other structure coupled to the translucent layer configured to receive a keypress or other input.

The dynamic input region may be defined along virtually any exterior surface of the electronic device formed by the translucent layer that is configured to receive an input, including a force input, a touch input, and/or a proximity input. The translucent layer may be formed from one or more translucent materials including, for example, glass, ceramic, plastic, or a combination thereof. As used herein, the term translucent or translucent layer may be used to refer to a material or layer that allows the passage of light and does not require that the material or layer be transparent, clear, or otherwise free from features that scatter or absorb some amount of light. In this regard, the term translucent may generally refer to a material or layer that is optically transparent, partially transparent, or otherwise able to transmit light. The translucent layer may be coupled with, or otherwise positioned along, one or more sensing layers or structures within the enclosure, as described herein, including a capacitive-based sensing layer, which may allow the dynamic input region to detect input along the translucent exterior surface of the electronic device.

A light-emitting element, or group of light-emitting elements may be positioned within the enclosure and configured to illuminate an active input area within the dynamic input region. The active input area may be a virtual trackpad positioned on a particular area or portion of the dynamic input region configured to control a function of the electronic device in response to an input. For example, while the entire dynamic input region may be configured to detect input, in certain configurations, a specified area or portion of the dynamic input region may define an active input area (e.g., a virtual or dynamic track pad) that is used to control the electronic device in response to detected input; other areas or portions of the dynamic input region may be temporarily unresponsive to input. This may allow the active input area to be customizable within the dynamic input region based on user preferences, such as arranging the active input area in various positions and sizes within the dynamic input region.

To facilitate the foregoing, the light-emitting element may thus illuminate a visible boundary of the active input area within the dynamic input region. The visible boundary may indicate to a user the presence and location of input functionality on the device enclosure. For example, in some cases, the dynamic input region and/or the active input area may be concealed from a user. The translucent layer may appear to substantially resemble an exterior surface of an electronic device having no apparent input functionality; however, this is not required. In other cases, the dynamic input region and/or active input area may be optically distinguishable on the exterior surface in an unilluminated state. Once illuminated, the active input area may be manipulated within the dynamic input region and the visible boundary may be updated accordingly, thereby indicating to a user a new or updated location of input functionality on the exterior surface.

In a "side-illuminated" embodiment, where the translucent layer is illuminated from the side, the translucent layer may define a light guide that guides or directs light from the light-emitting element and defines the active input area within the dynamic input region. To facilitate the foregoing, the light-emitting element may be a side-firing light-emitting diode (LED) or other light-emitting element positioned along a side of the translucent layer. An internally reflective region of the translucent layer may propagate light received from the light-emitting element along a length of the enclosure toward light-extraction features. The light-extraction features may include textured features that extract light from the translucent layer and illuminate a visible boundary of the active input area. For example, the light-extraction features may have a distinct index of refraction or other optical property that redirects light toward the external surface of the enclosure when the light traverses a boundary between the internally reflective region and the light extraction features. The electronic device may be responsive to input received within the active input area when the visible boundary is illuminated. For example, when the visible boundary is illuminated, a sensing layer (including a capacitive-based sensor) may detect input within the active input area and a display of the electronic device may be responsive to the detected input.

In a "bottom-illuminated" embodiment, where the translucent layer is illuminated from beneath the external surface, a light control layer may be used to control the propagation of light through the translucent layer and define the active input area within the dynamic input region. The light control layer may be positioned along an internal surface of the translucent layer and control the propagation of light through the translucent layer using a group of illuminable features. The light control layer may generally impede or impair the propagation of light. The group of illuminable features may be regions of the light control layer where light may propagate from an interior of the electronic device to the translucent layer.

The group of illuminable features may be illuminated to define a visible boundary (or other characteristic) of the active input area within the dynamic input region. In a particular embodiment, the light control layer may be an ink, coating, substrate, deposition, or other structure that blocks light and the group of illuminable features may include an array of microperforations forming a channel or passage through the light control layer that defines a boundary of the active input area when illuminated. The array of microperforations may also be selectively illuminated (using an LED matrix or the like) in order to vary a size, position, shape, and so on of the active input area within the dynamic input region. In other embodiments, the light control layer may be a polarizing layer and/or other components that operate to control the passage of light through individual indicators. For example, the group of illuminable features may be individually selectable windows or regions, which may allow light to propagate therethrough in response to a signal (e.g., which may be controlled by a processing unit of the electronic device).

The light control layer may be used to define a variety of user-customizable shapes, sizes, positions, configurations, and so forth of the active input area within the dynamic input region. For example, multiple, distinct visible boundaries of the active input area (first visible boundary, second visible boundary, and so on) may be illuminated within the dynamic input region successively. The visible boundaries may correspond to distinct sizes, shapes, positions, and so on of an active input area, which may have a user-customizable shape, size, or the like on the dynamic input region. The electronic device may be responsive to input received within the dynamic input region based on the illuminated boundary of the active input area. Accordingly, the active input area may not be limited to a particular configuration or position within the dynamic input region, but rather may be manipulated by a user into a variety of customizable configurations. This may be beneficial, for example, where the active input area defines a trackpad of a notebook computer; the trackpad can be resized or repositioned along a translucent device enclosure based on user-specified preferences and thus enhance the functionality and/or adaptability on the electronic device.

The electronic device may be configured to depict a visual output within the dynamic input region. As described herein, the visual output may be visual cues to prompt an input and, in other cases, may be responsive to, or produced, when the electronic device receives an input. For example, the visual output may cue the user to enter input and/or confirm or provide additional information to a user in response to a detected input. The light-emitting elements described herein may be configured to propagate light through the translucent layer and depict the visual output within the dynamic input region. In some embodiments, the light control layer may be used to control the propagation of light through the translucent layer. The light-emitting element may illuminate the visual output on the translucent exterior surface in response to an input received along the dynamic input region. Sample visual outputs in this regard may include an illumination of a location of a touch input, a path of travel of a touch input along the dynamic input region, the entire active input area, and so on. The visual output may also be used to visually emphasize aesthetic characteristics of the active input area, including emphasizing an interior periphery (corresponding to a gradient brightness, contrast, and/or other optical periphery or visual effect), a boundary thickness or edge fade, and/or adjusting a color or brightness of the active input area, among other possibilities. The visual output may also be used to identify a function of the electronic device that may be controlled or manipulated in response to an input.

In some embodiments, the dynamic input region may be used to convey information to the user corresponding to a notification, status, configuration, and/or other information related to the electronic device. For example, the visual output depicted within the dynamic input region, described above, may include or correspond to information related to the electronic device. In some embodiments, the visual output may correspond to a location of a component or assembly of the electronic device, such as a location and/or function related to an inductive charging coil, power button, wireless antenna, and so on. The visual output may also be updateable or dynamic. For example, the visual output may correspond to a power level (battery charge or battery depletion level) of the electronic device, a location and/or strength of a wireless internet connection, and/or other updateable or dynamic information. Accordingly, as described herein, the dynamic input region need not receive an input or be used to control a function of an electronic device. However, it will be appreciated that in some cases the visual output depicted within the dynamic input region may be used to both convey information related to the electronic device and receive an input that controls a function of the electronic device. To illustrate, the dynamic input region may have a visual output corresponding to a strength of a wireless internet signal that may also be displayed on a portion of the translucent layer used to control one or more properties of a wireless internet connection in response to an input (such as selecting a wireless network depicted at a display of the electronic device).

Broadly, the dynamic input region may include any appropriate sensing element configured to detect a touch input, force input, and/or proximity input along the exterior translucent surface of the electronic device. The sensing element may be positioned within the enclosure and configured to detect input received within the active input area or more generally along the dynamic input region or other region of the translucent layer (such as a keyboard region, described herein). A user may manipulate the active input area within the dynamic input region. As such, the sensing element may be adaptable to generate an input signal (that controls a function of the electronic device) in response to input received within the input area for a given configuration (e.g., based on a position of the active input area within the dynamic input region). For example, the sensing element may generate an input signal in response to input received within a visible boundary of the input area, but remain substantially unresponsive to input received outside of the visible boundary.

In one embodiment, the sensing element may be a non-contact-based sensor that measures various electrical parameters to detect a touch and/or force input, including optical, magnetic, and capacitance-based sensors, among other non-contact-based sensors. In other cases, the sensing element may be, or form a component of, a contact-based sensor, including a tactile dome switch, strain gauge, piezoelectric or electroactive polymer (EAP) stack, or the like, among other contact-based sensors. The sensing element may include multiple combinations of sensors, including contact-based and non-contact-based sensors, that cooperate to measure the force and/or touch input received at the translucent external surface. In some cases, the sensing element may measure localized or generalized deflection or bending of the translucent layer inward and trigger a corresponding switch event. The sensing element may also be configured to produce various haptic effects, as described herein, and/or be coupled with a separate haptic structure that produces a haptic or tactile output along the input region.

The sensing element may be configured to detect inputs at distinct regions or areas of the translucent layer. This may allow the dynamic input region to define multiple active input areas on the translucent layer that may each correspond to distinct functions of the electronic device. For example, individual active input areas may correspond to keyboard keys, buttons of a video game controller, or other virtual keys or buttons that may be operated in succession or are otherwise desired to be defined on the translucent layer within one another. In some cases, the sensing layer may also detect input received at the distinct input area concurrently. This may be beneficial, for example, where the translucent layer is used to form a trackpad and one or more buttons within the dynamic input region. For example, the sensing element may detect a scrolling input or motion along an active input defining the trackpad and also detect an input at an active input area defining a button or keyboard key.

In a particular embodiment, the electronic device may be a notebook computer and the dynamic input region may be defined on one or more pivotally coupled portions of the enclosure. For example, the enclosure may include an upper portion pivotally coupled to a lower portion. The upper portion may include an upper enclosure and house or partially contain a touch-sensitive display that depicts a graphical output of the electronic device. The lower portion may include a lower enclosure and may have a translucent layer that defines an exterior or upper surface of the electronic device along which the dynamic input region may be arranged.

In addition to the dynamic input region, the translucent layer may also have a keyboard region defined along the exterior or upper surface. The keyboard region may include one or more tactile switch assemblies coupled with the translucent layer that are configured to detect input at a key surface of a key cap or other input structure and generate a tactile response. The dynamic input region may be arranged on the translucent layer proximate the keyboard region (and/or adjoin or partially overlap) and define an active input area that forms a trackpad for the electronic device. The trackpad may be manipulated into a variety of configurations within the dynamic input region, as described herein, and be used to control a function of the electronic device that is distinct from the keypress. For example, the graphical output depicted at the display may be modified in a first manner in response to the keypress and in a second manner in response to input received within the active input area.

As described herein, the dynamic input region may be configured to depict a visual output of the trackpad at the translucent layer that is separate and distinct from the graphical output of the display. For example, as described above, the dynamic input region may visually emphasize the active input area, illuminate a boundary of a touch contact, and/or provide updateable information (battery level, wireless signal strength, and so on) corresponding to the electronic device that is separate and distinct from the graphical output depicted at the display.

In certain embodiments, the visual output of the dynamic input region may be visually perceptible when the upper portion and the lower portion are in a closed position. As described herein, the upper and lower portions may pivot relative to one another such that major surfaces of the upper portion and the lower portion are positioned proximate to one another or otherwise aligned to define a closed configuration of the electronic device. The dynamic input region may depict a visual output along a periphery of the major surface of the lower portion that may be at least partially visible between the closed upper and lower portions. For example, a light-emitting element may be configured to propagate light through the translucent layer and/or between a gap separating the closed upper and lower portions (which may extend along a direction substantially away from the enclosure). The light may be indicative of a status or other information relating to the electronic device, such as a power or battery depletion level. This may allow a user to receive updatable information from the electronic device even when the enclosure is closed.

It will be appreciated that while the foregoing describes the dynamic input region defined on a notebook computer enclosure, the dynamic input region may be defined on substantially any electronic device enclosure having a translucent enclosure or device body. Sample devices include a smart watch, stylus, other portable or wearable electronic device, portable media players, and so on. Broadly, the electronic device may be defined by any enclosure (at least a portion of which is translucent) having one or more openings that surround or contain a display and/or a button. In other embodiments, the electronic device may be a component or segment of a substantially mechanical structure, such as a wall of a building, a panel, dashboard, door, doorframe, or the like. For example, a wall of a building may be used to define the dynamic input region and control various functions of the building, such as climate controls, lighting, and so on. As such, the discussion of any electronic device is meant as illustrative only.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 A depicts an electronic device 104, such as the electronic device generally discussed above and described in more detail below. The electronic device 104 may include a translucent layer that forms an external surface of an enclosure of the electronic device 104. A dynamic input region or trackpad may be defined along the external surface of the enclosure and used to control a function of the electronic device 104.

In a non-limiting example, as shown in FIG. 1A, the electronic device 104 may include an upper portion 109a and a lower portion 109b. The lower portion 109b may be pivotally coupled with the upper portion 109a, for example, about a hinge 110, described below. The upper portion 109a and the lower portion 109b may cooperate to form or define a shape of notebook computer. Various components and assemblies of the electronic device 104 may be positioned within one or both of the upper portion 109a or lower portion 109b to facilitate the operation of the electronic device 104.

An exterior surface of the electronic device 104 may be defined by an enclosure 108. For example, the enclosure 108 may define sidewalls, and top and bottom surfaces of the electronic device 104 that enclose or encompass internal components of the electronic device 104, including various electrical and structural components described herein. The enclosure 108 may include multiple layers or assemblies that be positioned within one or both of the upper portion 109a and/or the lower portion 109b.

For purposes of illustration, FIG. 1A shows the enclosure 108 as having an upper enclosure 108a and a lower enclosure 108b. The upper enclosure 108a may be positioned or arranged as a component of the upper portion 109a of the electronic device 104 and the lower enclosure 108b may be positioned or arranged as a component of the lower portion 109b of the electronic device. The upper enclosure 108a may be pivotally coupled with the lower enclosure 108b about a hinge 110. The hinge 110 may allow the upper enclosure 108a and the lower enclosure 108b to pivot relative to one another and define an open configuration (as shown in FIG. 1A) and a closed configuration (as described with respect to FIGS. 8A and 8B) of the electronic device 104. In the closed configuration, major surfaces of the upper enclosure 108a and the lower enclosure 108b may be positioned substantially parallel with one another.

The electronic device 104 may include a touch-sensitive display 114 at least partially positioned within the enclosure 108. For example, the upper enclosure 108a may define an opening 112 and the touch-sensitive display 114 may be at least partially positioned within the opening 112. The touch-sensitive display 114 may be configured to depict a graphical output of the electronic device 104. The graphical output depicted on the touch-sensitive display 114 may be responsive to various types of detected input, described herein, including a touch input, force input, and/or a proximity input detected at a keyboard or keyboard region of the electronic device 104 and/or a dynamic contact region of the trackpad.

The enclosure 108 may have, or be partially formed from, a translucent layer. For example, as shown in FIG. 1A, an exterior or upper surface of the lower enclosure 108b of the enclosure 108 may be formed from a translucent layer 116. In certain embodiments, the translucent layer 116 may be a light transmissible layer that allows light to propagate therethrough. In some cases, the translucent layer 116 may include an internal reflection region and define a light guide that allows light to travel along a length of the translucent layer. In other cases, the translucent layer 116 may allow light to propagate between an exterior and interior of the electronic device 104 substantially unobstructed. The translucent layer 116 may be formed from a ceramic (e.g., sapphire, conundrum), glass, plastic, synthetic, composite, or other appropriate translucent, transparent, partially transparent, or otherwise light-transmissible structure configured to form a surface of a device enclosure. While the translucent layer 116 is shown forming substantially an entire exterior or upper surface of the lower enclosure 108b, it will be appreciated that that translucent layer 116 may be used to define a smaller or larger exterior surface (or regions thereof) of the enclosure 108, including embodiments where the translucent layer 116 forms an exterior surface of both the upper enclosure 108a and the lower enclosure 108b.

In the embodiment of FIG. 1A, the translucent layer 116 may define or form a keyboard region 118. The keyboard region 118 may be a region of the electronic device 104 having one or more mechanical keys, buttons, switches, or other input surfaces that may be used to provide input to the electronic device 104. In some embodiments, the keyboard region 118 includes a virtual keyboard that includes an array of key regions, each region having a key surface and a switch or sensing element for detecting a keystroke (e.g., a touch or press).

In the embodiment of FIG. 1A, the electronic device 104 is shown as having a keyboard 120 arranged within the keyboard region 118 and coupled with and/or along the translucent layer 116. The keyboard 120 may be a mechanical keyboard (e.g., having mechanically-actuated keys) and include a set of illuminable key caps 122. Each of the set of illuminable key caps 122 may have a key surface and an illuminable portion at which light from a light-emitting element may visually emphasize a location, size, and/or function of a key. The set of illuminable key caps 122 may be substantially surrounded by, and at least partially protrude from, the translucent layer 116, for example, as may be the case where the keyboard 120 is positioned within an opening defined in the translucent layer 116. In other cases, as shown in FIG. 1A, the set of illuminable key caps 122 may be positioned above the translucent layer 116, for example, as may be the case where the keyboard 120 is a separate layer positioned over the translucent layer. The set of illuminable key caps 122 may be configured to receive a keypress (e.g., a touch and/or force input). The keypress may depress a particular one of the set of illuminable key caps 122 that may control the electronic device 104. To facilitate the foregoing, the keyboard 120 may include various support structures (butterfly mechanisms, scissor mechanisms, and so forth), tactile elements (collapsible dome), switch elements (sensing membrane), and/or any other appropriate component configured to detect a keypress, described in greater detail below with respect to FIG. 1B.

An exterior or upper surface of the translucent layer 116 adjacent to (or partially overlapping) the keyboard region 118 may resemble an exterior surface of a device enclosure free of markings and/or having a substantially uniform appearance. Despite appearances, in an activated state, the electronic device 104 may define a dynamic input region 128 along the exterior surface of the translucent layer 116. The dynamic input region 128 may be a region of the translucent layer 116 configured to receive an input, including a touch input, a force input, and/or a proximity input that is used to control a function of the electronic device 104. For example, the dynamic input region 128 may be a region of the translucent layer 116 coupled with or positioned along a sensing element, described herein, that may detect input along the exterior surface of the enclosure 108.

The translucent layer 116 may be illuminated to reveal the input functionality of the dynamic input region 128. For example, as described in greater detail below, in a side-illuminated embodiment, the translucent layer 116 may be a light guide configured to channel or redirect light along a length of the enclosure 108. The translucent layer 116 may include internal reflective properties or otherwise have an internal reflection region that allows light optically coupled with the translucent layer 116 to propagate within the translucent layer 116 without substantially escaping. One or more light-extraction features, such as a textured region, formed into the translucent layer 116 may expel light from the translucent layer 116 and reveal the input functionality of the dynamic input region 128.

Additionally or alternatively, in a bottom-illuminated embodiment, the dynamic input region 128 may be a concealable or hidden input region of the electronic device 104. For example, a light control layer having a group of illuminable features may be positioned along an underside surface of the translucent layer 116. The light control layer may generally conceal an interior of the enclosure 108 and the indicators may be visually imperceptible or invisible when not illuminated. When activated, the electronic device 104 reveals the dynamic input region 128 by propagating light through the group of illuminable features to display a boundary or an active input area, symbol, glyph, marking, or other visual output of the dynamic input region 128. An input assembly, sensing element or the like, including various haptic elements or structures, may be positioned below the dynamic input region 128 and configured to trigger a switch event and/or deliver a haptic output in response to an input received along the dynamic input region 128.

As shown in FIG. 1A, the keyboard region 118 and keyboard 120 are positioned adjacent the dynamic input region 128. More specifically, the keyboard region 118 and keyboard 120 are partially surrounded by the dynamic input region 128. In some embodiments, the dynamic input region 128 is positioned along a side of the keyboard region 118. In embodiments where the keyboard 120 is a virtual keyboard, the keyboard may be integrated with the translucent layer 116 and the dynamic input region 128 may partially surround and/or be integrated with the keyboard 120.

The electronic device 104 may include various other input/output components that support one or more functions of the electronic device 104. For purposes of illustration, FIG. 1A depicts the electronic device as including the touch-sensitive display 114 and keyboard 120. The electronic device 104 may also include a processing unit (optionally including executable logic and/or sets of computer readable instructions) and/or other hardware or software for use in facilitating the operation described herein (e.g., processing unit 1208 of FIG. 12). It should be noted that the electronic device 104 may also include various other components, such as one or more ports (e.g., a charging port, a data transfer port, or the like), communications elements, additional input/output members (including additional buttons), and so on. It will be appreciated that the electronic device 104 may be any suitable device having a concealable or hidden input region, as described herein, including data-entry devices, word-processing devices, desktop computers, notebook computers, smart phones, tablets, portable media players, or the like. Other examples of electronic devices may include health monitoring devices, digital cameras, printers, scanners, security systems or devices, or electronics for automobiles, buildings, or other structures, among other electronic devices. As such, the discussion of any electronic device, such as electronic device 104, is meant as an illustration only.

Figure 1B:
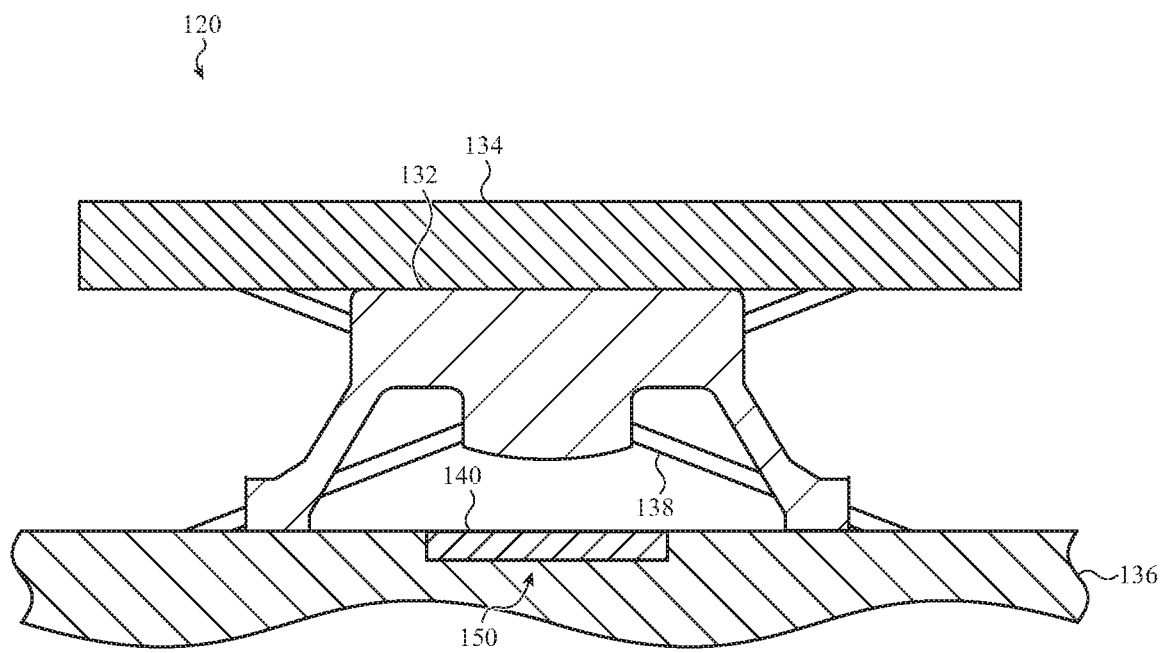
FIG. 1B depicts a cross-sectional view of a tactile switch assembly of the sample electronic device of FIG. 1A, taken along line A-A of FIG. 1A.

FIG. 1B depicts a cross-sectional view of the keyboard 120 of FIG. 1A, taken along line A-A of FIG. 1A. As illustrated, the keyboard 120 includes a tactile element 132 (e.g., a collapsible dome or other deformable structure), a key cap 134, a substrate 136 (e.g., a printed circuit board, having one or more sensor or electrical contacts), and a support structure 138. The substrate 136 may define a base or base portion of the keyboard 120. In some cases, the substrate 136 may be formed from and/or defined by a portion of the translucent layer 116, described with respect to FIG. 1A. For example, the key cap 134 and tactile element 132 may be substantially positioned along an exterior surface of the translucent layer 116 and a sensing element disposed partially within or along the translucent layer 116 may detect a keypress received at the key cap 134. In other cases, the substrate 136 may be a printed circuit board, electrical substrate, or the like arranged within an interior of the electronic device 104 defined by the enclosure 108. For example, the key cap 134 and the tactile element 132 may be at least partially positioned within an opening defined by the translucent layer 116 and the substrate 136 may detect a keypress received at the key cap 134 as it is advanced inward toward the interior of the enclosure 108.

To facilitate the foregoing, the substrate may include switch element 140. The switch element 140 may be a contact-based and/or non-contact-based sensor that detects a keypress received at the key cap 134. For example, the switch element 140 may define one or more electrical traces that may trigger a switch event in response to a contact from the tactile element 132 or other component of the keyboard 120 when the key cap 134 (having a key surface) is depressed. In other cases, the switch element 140 may be, or form a component of, a capacitive, magnetic, and/or optical based sensor configured to detect movements of the key cap 134 caused by the keypress and trigger a corresponding switch event. As shown in the embodiment of FIG. 1B, the switch element 140 is positioned at least partially within the substrate 136; however, this is not required. In other cases, the switch element 140 may be positioned along an interior and/or exterior surface of the substrate 136 (where the substrate 136 is a portion of the translucent layer 116). The switch element 140 may also be separated from the substrate 136 in some embodiments.

The substrate 136 may also be configured to facilitate illumination of the key cap 134. For example, the substrate 136 may be a portion of the translucent layer 116 or otherwise be formed or constructed from a translucent material that allows light to propagate therethrough. As such, a light-emitting element of the electronic device 104 (not shown in FIG. 1B) may illuminate some or all of the substrate 136. The substrate 136 may subsequently direct the received light toward the key cap 134 and illuminate an illumination symbol or glyph.

The tactile element 132 may be any appropriate structure that delivers a tactile effect to the key cap 134 in response to a keypress. In the embodiment depicted in FIG. 1B, the tactile element 132 is a collapsible dome. The collapsible dome may buckle in response to a depress of the key cap 134. It will be appreciated, however, that the tactile element 132 may take other shapes and forms, including being formed from a compliant material or compliant overlay having various geometric features and material properties (pockets, protrusions, densities, and so on) that is positioned over the translucent layer 116. In this regard, the tactile element 132 may be configured to deliver a tactile sensation corresponding to the operation of a mechanical key, notwithstanding the configuration of other components or subassemblies of the keyboard 120.

In this regard, in certain embodiments, the tactile element 132 may be formed from any appropriate material (e.g., including metal, rubber, or the like) that exhibits sufficiently elastic characteristics. For example, the tactile element 132 may be sufficiently elastic or resilient such that it does not permanently deform from applied force (e.g., the tactile element 132 may substantially return to an original or undeformed shape after the force ceases). The key cap 134 may deform the tactile element 132 upon the depression of the key cap 134. In turn, the tactile element 132 may return to an undeformed shape when the key cap 134 returns to a neutral or undepressed condition. The tactile element 132 may not be limited to the above example materials, and may also include any other appropriate materials consistent with the various embodiments presented herein, including silicone, plastic or other flexible and resilient materials.

As shown in FIG. 1B, the support structure 138 may support the key cap 134 above the substrate 136. The support structure 138 may guide movement of the key cap 134 toward the tactile element 132 and the substrate 136 during a keypress. The support structure 138 may be an optional component of the keyboard 120. For example, in some embodiments, the key cap 134 may be supported above the substrate 136 by the tactile element 132 and/or the key cap 134 may be positioned along the substrate 136. As such, while the support structure 138 may be a butterfly mechanism or scissor mechanism, other structures are contemplated that support the key cap 134 and guide movement of the key cap 134 as it is depressed.

As described above with respect to FIG. 1, the keyboard 120 may be coupled with and/or positioned along or partially within the keyboard region 118 defined on the translucent layer 116. The dynamic input region 128 may be defined along a region of the translucent layer 116 adjacent or proximate to (and/or partially overlapping) the keyboard region 118. Accordingly, the keyboard region 118 and the dynamic input region 128 may be defined along a common exterior surface of the enclosure 108. The electronic device 104 may illuminate some or all of the dynamic input region 128 on the translucent layer 116 to reveal the input functionality of the enclosure 108. The dynamic input region 128 may also be illuminated to produce various visual outputs on the translucent layer 116.

Figure 1C:
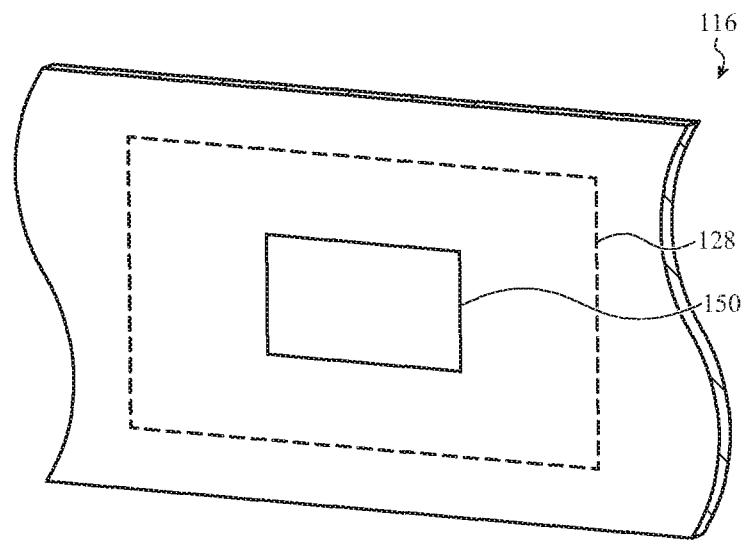
FIG. 1C depicts an enlarged view of the dynamic input region having an illuminated input area.
Figure 1D:
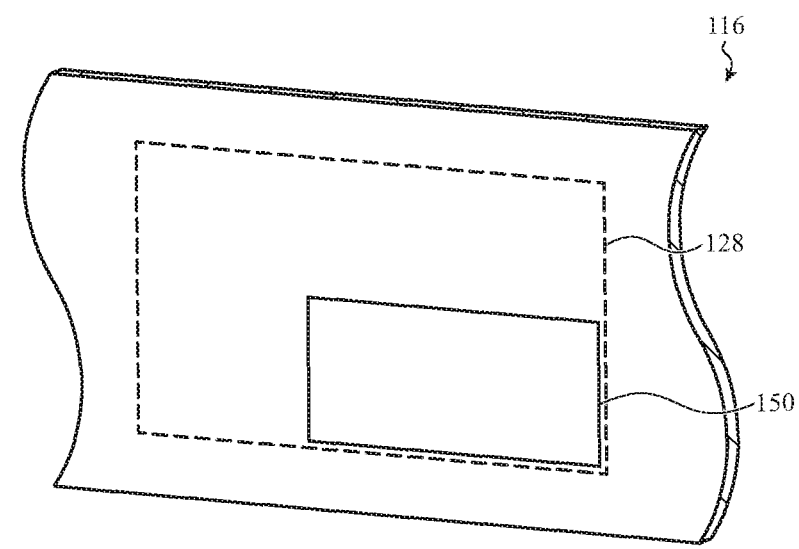
FIG. 1D depicts an enlarged view of the dynamic input region having a modified illuminated input area.

With reference to FIGS. 1C and 1D, particular embodiments, the electronic device 104 may illuminate an active input area within the dynamic input region 128. The active input area may correspond to a particular area or portion of the dynamic input region 128 configured to control a function of the electronic device 104 in response to an input. For example, while the entire dynamic input region 128 may be configured to detect input, a specified area or portion of the dynamic input region 128 may define an active input area that is used to control the electronic device 104 in response to detected input; other areas or portions of the dynamic input region 128 may be temporarily unresponsive to input. This may allow the active input area to be customizable within the dynamic input region 128 based on user preferences, such as arranging the active input area in various positions and sizes within the dynamic input region 128. In this regard, FIGS. 1C and 1D depict the translucent layer 116 having the dynamic input region 128 in various states of illumination that may define the active input area.

FIG. 1C depicts the translucent layer 116 having the dynamic input region 128 defined along an exterior surface. As shown in FIG. 1C, the dynamic input region 128 may include an active input area 150, such as the active input areas generally described above and described in great detail below. The active input area 150 may be a specified area or portion of the dynamic input region 128 that is configured to detect an input and control a function of the electronic device 104 (e.g., such as manipulate a graphical output of the touch-sensitive display 114 and/or otherwise provide input to the electronic device 104, including trackpad-type input). The electronic device 104 may include various light-emitting elements configured to illuminate the active input area 150 on the translucent layer 116. The light-emitting elements may therefore be used to indicate to the user the presence of input functionality on the translucent layer 116 and, specifically, the location or boundary within the dynamic input region 128 configured to receive input and control a function of the electronic device 104. One or more sensing elements of the electronic device 104, described herein, may be configured to detect input received within the active input area 150.

The active input area 150 may be manipulated within the dynamic input region 128. As sample possibilities, a size, shape, position, or the like of the active input area 150 may be manipulated or otherwise changed or updated within the dynamic input region 128. This may occur in response to an input received within the dynamic input region 128 (e.g., such as a gesture or other input) and/or in response to a signal from a processing unit and/or other component or assembly of the electronic device 104. To facilitate the foregoing, the light-emitting elements of the electronic device 104 may be selectively operable to illuminate different (or overlapping) areas or portions of the translucent layer 116 to define different boundaries of the active input area 150. Analogously, the sensing elements of the electronic device 104 may also be selectively operable to detect input received within a new or updated boundary of the active input area 150.

With reference to FIG. 1D, the active input area 150 is shown illuminated within the dynamic input region 128 having a distinct size and position as that of the active input area 150 shown and described with respect to FIG. 1C. For example, the active input area 150 depicted in FIG. 1D may be illuminated in a lower right corner of the dynamic input region 128 and encompass a larger portion of the dynamic input region 128 than the active input area of the embodiment of FIG. 1C. For example, the light-emitting elements of the electronic device 104 may illuminate the translucent layer 116 in a different or predetermined manner and cause an updated or new boundary of the active input area 150 to be illuminated on the translucent layer 116 corresponding to the manipulated size and location or other manipulated characteristic of the active input area 150.

The resized and repositioned active input area 150 may accommodate a user-specified preference. For example, where the active input area 150 defines a trackpad of the electronic device 104, a user may desire to resize and/or reposition the trackpad along the device enclosure to facilitate use of the electronic device 104, including various applications, programs or functions performed or depicted on the electronic device 104. The resizing, repositioning, or other manipulation of the active input area 150 may occur in response to, for example, a gesture or other user input received along the dynamic input region 128, the keyboard region 118, or other input device or structure of the electronic device 104, including the touch-sensitive display 114. Once resized, repositioned, or otherwise changed, the sensing elements of the electronic device 104 may be responsive to detect input received within the updated boundary of the active input area 150. In this regard, the electronic device 104 may be configured to distinguish between input received along the dynamic input region 128 that is within and/or outside of the active input area 150. This may allow the electronic device 104 to be controlled by input received within the illuminated boundary of the active input area; however, in other cases it may be desirable to detect input received outside of the illuminated boundary as well (e.g., as described in greater detail below with respect to FIG. 6B).

As described herein, the electronic device 104 may be configured to depict various visual outputs within the dynamic input region 128. Broadly, visual outputs of the dynamic input region 128 may be substantially any optical or visual effect depicted on the translucent layer 116. In some embodiments, visual outputs of the dynamic input region 128 may visually emphasize a boundary or other feature of an active input region (e.g., as described in greater detail below with respect to FIGS. 3A-3C). Visual outputs of the dynamic input region 128 may also be used to indicate or confirm an input received along the dynamic input region 128, such as a magnitude to position of an input (e.g., as described in greater detail below with respect to FIGS. 4A-5C), or otherwise be used to optically enhance the dynamic input region 128 and/or the active input area 150.

Figure 1E:
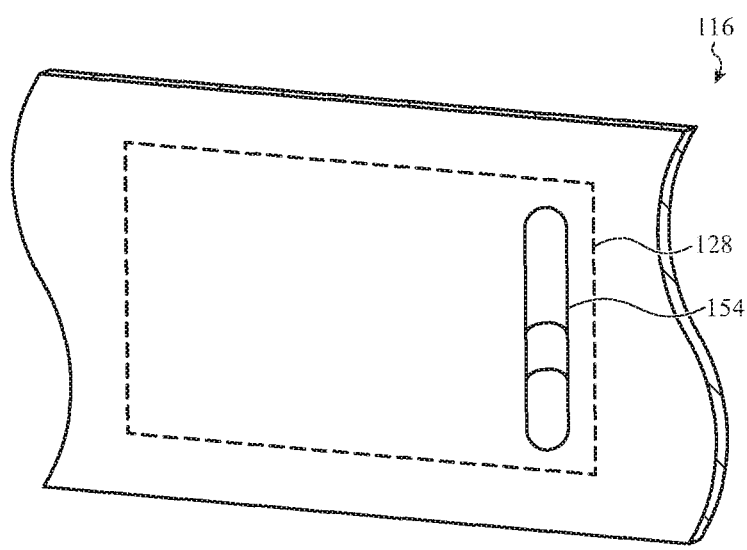
FIG. 1E depicts an enlarged view of the dynamic input region depicting a visual output.

Visual outputs of the dynamic input region 128 may also be used to convey information relating to the electronic device 104. In this regard, the dynamic input region 128 may be configured to depict output of the electronic device 104 along the translucent layer that defines an exterior surface of the enclosure 108. With reference to FIG. 1E, for example, the translucent layer 116 is shown as having a visual output 154 illuminated within the dynamic input region 128. The visual output 154 may be a symbol representative of a battery depletion level (battery charge) of the electronic device 104. As such, the visual output 154 may be updateable or dynamic; as the battery level rises or falls, the visual output 154 may correspondingly change. It will be appreciated that the symbol representative of a battery depletion level is shown in FIG. 1E for purposes of illustration only. As described in greater detail below, visual outputs may be substantially any appropriate symbol, indicia, graphics or the like including updateable symbols, such as symbols representative of a wireless signal strength, a location of a wireless signal, a notification (including text and/or email-based notifications), and so on. Further, visual outputs may also be symbols that indicate the location or particular components or assemblies of the electronic device 104, such as an internal charging assembly (inductive coils), among other possibilities.

FIGS. 2A-2F depict cross-sectional views of various embodiments of the dynamic input region 128 of FIG. 1A, taken along line B-B of FIG. 1A. The dynamic input region 128 may be defined along the translucent layer 116 that forms an exterior surface 119a of the electronic device 104. Broadly, the translucent layer 116 may be illuminated from the side ("side-illuminated" embodiment) and/or from below ("bottom-illuminated" embodiment). In the side-illuminated embodiment, the translucent layer 116 may be illuminated to define a specific visual output (e.g., a virtual trackpad). The side illuminated embodiment may also include multiple layers that, together, can be used to create a dynamic visual output. In the bottom-illuminated embodiment, an array of light-emitting elements may illuminate a configurable or customizable boundary of a virtual trackpad and/or other visual input. In this regard, the dynamic input region 128 may be associated with a region of the electronic device 104 having various light-emitting elements, sensing elements, haptic structures, and/or other components or assemblies that are configured to define an active input area 150, and the translucent layer 116 and detect an input. The embodiments of the dynamic input region 128 depicted in FIGS. 2A-2F are shown and described as sample implementations of the electronic device 104; it will be appreciated that other implementations are possible and contemplated within the scope of the present disclosure.

Figure 2A:
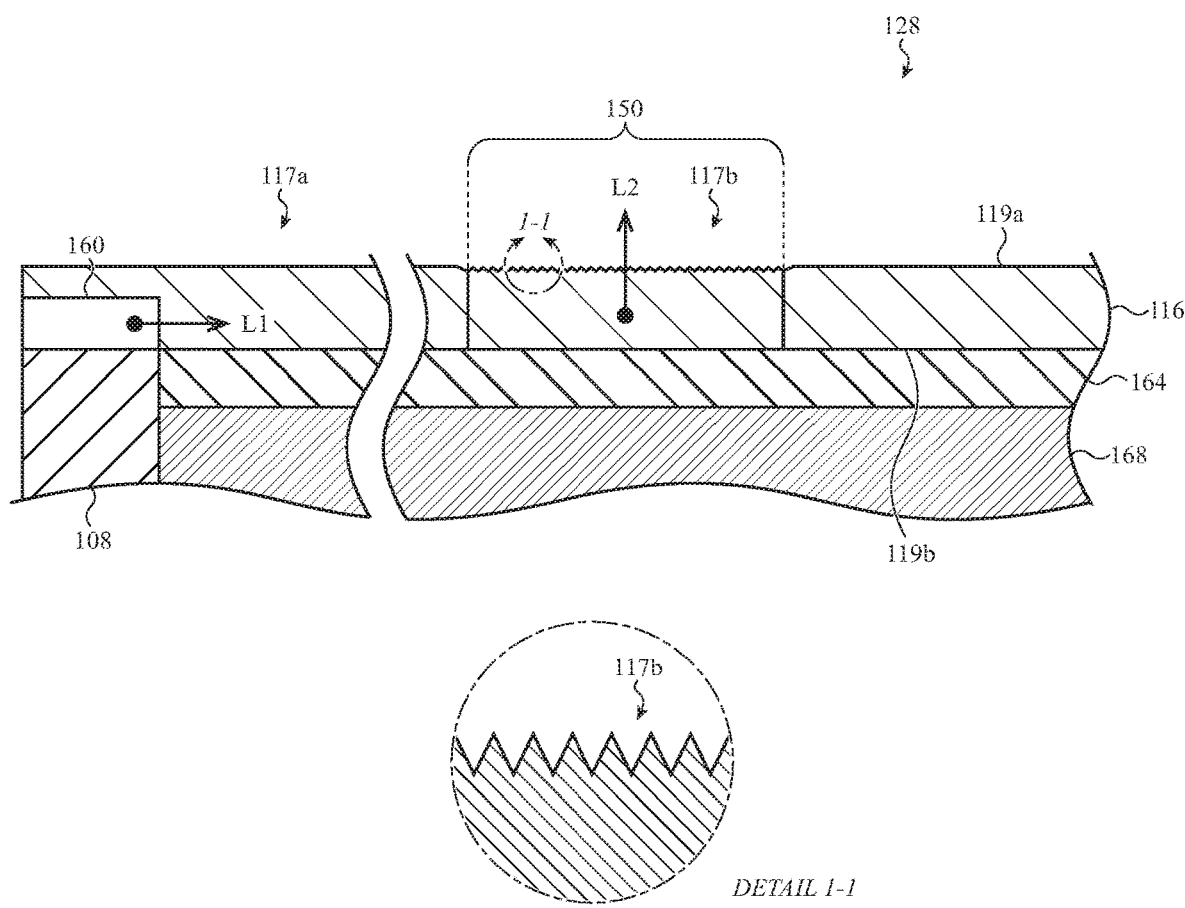
FIG. 2A depicts a cross-sectional view of the dynamic input region of FIG. 1A, taken along line B-B of FIG. 1A.

With reference to FIG. 2A, a side-illuminated embodiment is shown. In particular, the dynamic input region 128 is shown in an embodiment in which the translucent layer 116 defines a light guide along the exterior surface 119a. The translucent layer 116 may be configured to channel or redirect light along a length of the exterior surface 119a and illuminate the active input area 150. To facilitate the foregoing, the translucent layer 116 may include both an internal reflection region 117a (configured to propagate light within and along the translucent layer 116) and light-extraction features 117b (configured to expel or extract light from the translucent layer 116). The light-extraction features 117b may be formed into the translucent layer 116 and/or partially be surrounded by the internal reflection region 117a. In some cases, the internal reflection region 117a and the light-extraction features 117b may form a substantially continuous surface of the electronic device 104. The light-extraction features 117b may obstruct or redirect light propagating through the translucent layer 116 such that the light exits the translucent layer 116 and illuminates the active input area 150. For example, the light-extraction features 117b and the internal reflection region 117a may have different indices of refraction that cause light to exit the translucent layer 116 when light traverses a boundary between the light-extraction features 117b and the internal reflection region 117a. Additionally or alternatively, the light-extraction features 117b may be defined by various physical and/or geometric features that are distinct from the internal reflection region 117a, including geometric features of the light-extraction features 117b that may protrude from the exterior surface 119a.

The translucent layer 116 may be optically coupled with a light-emitting element 160, as shown in FIG. 2A. The light-emitting element 160 may be optically coupled along a side or end of the translucent layer 116; however, other configurations are possible. The translucent layer 116 may receive light from the light-emitting element 160 and channel the received light toward the light-extraction features 117b to define the active input area 150. As shown in FIG. 2A, the light-emitting element 160 may emit light substantially along light path L1, which may extend into a body or thickness of the translucent layer 116 at the internal reflection region 117a. The internal reflection region 117a may be configured to substantially prevent light from escaping from the translucent layer 116 and direct the light along light path L1 toward the light-extraction features 117b. The light-extraction features 117b may receive the light along light path L1 and redirect the received light toward the exterior surface 119a and illuminate the active input area 150, for example, substantially along light path L2. The light path L2 may thus represent a redirected path of light that initially emanates from the light-emitting element 160. By using the translucent layer 116 as a light guide, the light-emitting element 160 may thus be positioned away or offset from the active input area 150 (such as along the side of the translucent layer 116), which may allow components or assemblies of the dynamic input region 128 to be more tightly spaced or otherwise assembled in a manner that enhances the adaptability of the electronic device 104.

Various sensing elements, haptic structures, and/or other components may be positioned below the translucent layer 116. For example, as depicted in FIG. 2A, the electronic device 104 may include a sensing element 164 and a haptic structure 168 below the translucent layer 116. The sensing element 164 and the haptic structure 168 may be positioned along the translucent layer 116 corresponding to a location of the dynamic input region 128 on the exterior surface of the electronic device 104.

The sensing element 164 may be any appropriate component or assembly that detects a touch input, force input, and/or proximity input received within the active input area 150, or more generally along the dynamic input region 128 and/or other regions of the translucent layer 116. In this regard, the sensing element 164 may be a wide variety of components, sensors, assemblies, or the like that are positioned below and/or coupled with the translucent layer 116. In one embodiment, the sensing element 164 may be a non-contact-based sensing element that detects input received along the exterior surface 119a of the translucent layer 116. This may include a capacitive or magnetic-based sensor that is configured to detect a proximity of a user to the translucent layer 116, including a contact between the user and the exterior surface 119a. The non-contact-based sensing element may also detect localized or generalized bending or deflection of the translucent layer 116 which may be used to determine a corresponding force input associated with the deflection. Additionally or alternatively, the sensing element 164 may be a contact-based sensor, such as a tactile dome switch, that detects a force input on the external surface in response to localized or generalized bending or deflection of the translucent layer 116.

The haptic structure 168, may be any appropriate structure or component that produces a haptic or tactile output. In particular, the haptic structure 168 may be any appropriate component that delivers a movement or vibration along the external surface defined by the translucent layer 116 that is perceptible to human touch. The electronic device 104 may use the haptic structure 168 to deliver the haptic or tactile output in response to an input received within the active input area 150, or more generally along the dynamic input region 128. For example, the haptic structure 168 may be a mechanical structure, such as a collapsible dome, spring, or the like that produces movement or vibration in response to a force input received along the dynamic input region 128. In other cases, the haptic structure 168 may be an electrically actuated assembly that delivers a haptic or tactile output in response to a detection of a touch and/or force input by the sensing element 164. For example, the haptic structure 168 may be an electromagnet, electro active polymer or piezoelectric (EAP) stack, or the like. In an embodiment, the haptic structure 168 may be at least partially included within, or directly coupled to, the sensing element 164, for example, which may be the case where the haptic structure 168 is a collapsible dome of a tactile dome switch used to detect a force input received within the active input area 150.

Figure 2B:
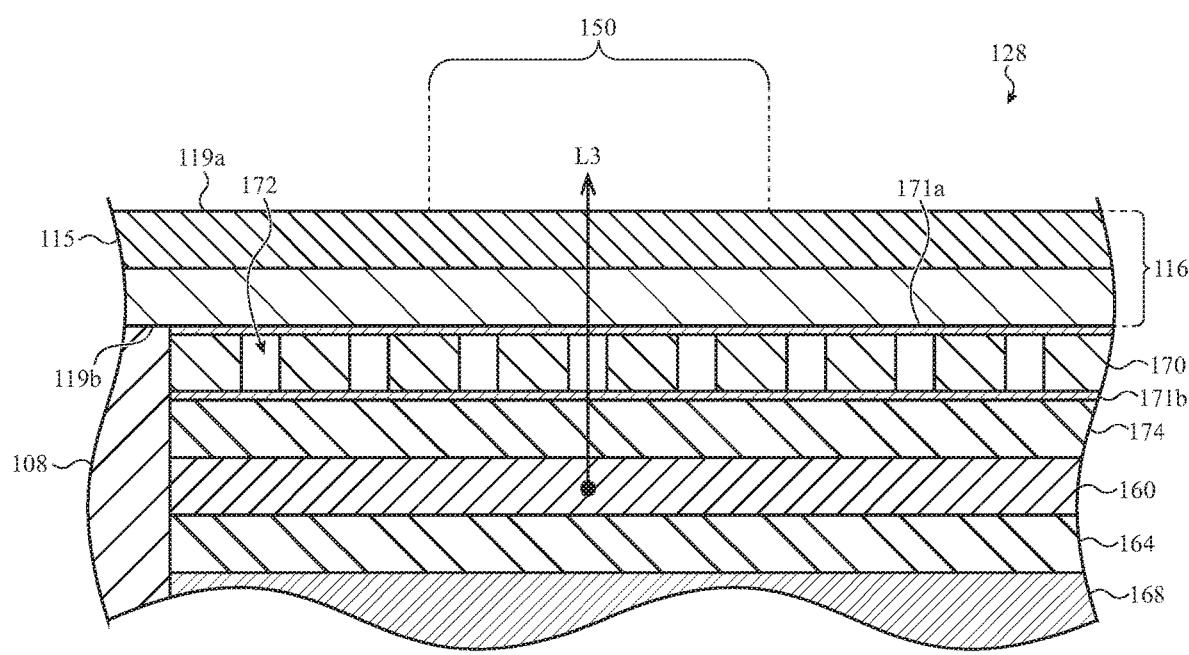
FIG. 2B depicts a cross-sectional view of the dynamic input region of FIG. 1A, taken along line B-B of FIG. 1A.

With reference to FIG. 2B, a bottom-illuminated embodiment is shown. In particular, the dynamic input region 128 is shown in an embodiment in which the active input area 150 is defined, at least in part, by the illumination of a group of illuminable features positioned below the translucent layer 116. The group of illuminable features may be positioned within a light control layer that extends along an underside surface 119b of the translucent layer 116. The light control layer may substantially block the passage of light. The group of illuminable features, which may be visually imperceptible along the exterior surface 119a, may allow light through the light control layer, thereby causing the active input area 150 to be illuminated. The indicators may also be illuminated to depict various graphical effects on the translucent layer 116, as described herein.

As shown in the embodiment of FIG. 2B, electronic device 104 may include a light control layer 170. The light control layer 170 may be positioned along and/or be coupled with the underside surface 119b of the translucent layer 116. The light control layer 170 may include a group of illuminable features 172. Light may generally pass through the light control layer 170 at the group of illuminable features 172. In this regard, the group of illuminable features 172 may be illuminated from within the enclosure 108 to define a boundary of the active input area 150 and/or other graphical effect within the dynamic input region 128. In some cases, distinct subsets of the group of illuminable features may be selectively illuminated in order to define different or updateable visible boundaries of the active input area 150 and/or other dynamic or updateable visual outputs within the dynamic input region 128.

In a particular embodiment, the light control layer 170 may be an ink, coating, resin, or other structure that blocks that passage of light and the group of illuminable features 172 may be a group of microperforations or holes extending through the light control layer 170. For example, the light control layer 170 may be formed directly on the underside surface 119b, for example, through a printing, deposition, sputtering, platting, or other appropriate process. In other cases, the light control layer 170 may be a separate substrate, film, or other layer applied to the underside surface 119b or on an intermediate (PET) layer connected to the underside surface 119b, described below. The group of microperforations may be openings, holes, through portions, cuts, grooves, recesses, or other features that extend through a complete thickness of the light control layer 170. In this regard, the group of microperforations may allow light to travel through the light control layer 170 and subsequently through the translucent layer 116.

At the exterior surface 119a, the group of microperforations may be substantially visually imperceptible when not illuminated. For example, the group of microperforations may have a size, shape, or other characteristic that renders the group of microperforations invisible or not visually perceptible to the unaided human eye. In one embodiment, the group of microperforations may have a width or other cross-dimension within a range of 30 microns to 70 microns. For example, the group of microperforations may be defined by a pattern of circles that each have a diameter within a range of 30 microns to 70 microns. The group of microperforations may be arranged across the light control layer 170 so that each perforation is separated by a distance within a range of 80 microns to 500 microns. For example, where each microperforation is defined by a circle, each circle may be separated across the light control layer 170 by a distance within a range of 80 microns to 500 microns. It will be appreciated that other dimensions and geometries are contemplated and described in greater detail below, including configurations in which a width of each microperforation is less than 30 microns or greater than 70 microns and where the separation distance is less than 80 microns or greater than 500 microns. Further, each microperforation need not have identical or uniform widths or separations; in some cases, various subsets of the group of microperforations may have distinct widths or separations, which may be used to produce a desired optical effect, among other considerations.

The group of microperforations may define a boundary, for example, of the active input area 150. As such, when illuminated, the input functionality on the translucent layer 116 may be revealed. The group of microperforations may also define various other symbols, glyphs, indicia, and/or other visual outputs at the dynamic input region 128. In other cases, the group of microperforations may define an array or a grid (such as a dot matrix) along the light control layer 170. Subsets of the group of microperforations may be illuminated to illuminate various different boundaries of the active input area 150. For example, as described in greater detail below with respect to FIG. 2D, a first subset of the group of microperforations may be illuminated to define a first boundary of the active input area 150 and a second subset of the group of microperforations may be illuminated to define a second boundary of the active input area 150.

In other embodiments, the light control layer 170 may be a polarizing layer and/or component or assembly configured to control the passage of light through the group of illuminable features. For example, the group of illuminable features 172 may include individually selectable windows or regions, which may allow light to propagate therethrough in response to a signal (e.g., which may be controlled by a processing unit of the electronic device 104). In this regard, the light control layer 170 may include various polarizing filters that may only allow light to pass through an indicator which exhibits a certain frequency, polarity, or other property. A liquid crystal element or other appropriate structure may be arranged within the group of illuminable features 172 and used to rotate or otherwise alter the received light such that it may pass through the indicator and associated polarizing filter. Individual liquid crystal elements may be individually actuated such that light may pass through selective ones of the group of illuminable features 172. This may allow the dynamic input region 128 to be illuminated with various customizable and updateable visual outputs in addition to illuminating the active input area 150 in various locations and configurations within the dynamic input region 128.

To facilitate the foregoing, the light-emitting element 160 may be positioned below the light control layer 170 and illuminate the group of illuminable features 172. In the embodiment of FIG. 2B, the light-emitting element 160 may be a backlight defined by one or more light-emitting diodes. Other light-emitting elements are contemplated, however, including embodiments where the light-emitting element 160 is, or forms a component of, a micro-LED, light guide, liquid crystal display (LCD), organic light-emitting diode (OLED), fluorescent light, and/or other light-emitting elements or structures (e.g., as described in greater detail below with respect to FIG. 2D). The light-emitting element 160 may generally be emitting light along light path L3 shown in FIG. 2B. The light path L3 may correspond to a boundary of the active input area 150 and/or a visual output depicted within the dynamic input region 128. As such, the light path L3 extends through one or more of the group of illuminable features 172 and the translucent layer 116 in order to illuminate the exterior surface 119a.

As shown in FIG. 2B, the external surface 119a may be defined along a textured region 115 of the translucent layer 116. The textured region 115 may be a region of the translucent layer having distinct optical properties that may facilitate illumination of the active input area 150. For example, the textured region 115 may be defined by a series of geometric features, including dimples, bumps, discontinuities, and so on that may diffuse or condition light that propagates through the translucent layer 116. In other embodiments, other shapes and configurations of the textured region 115 may be possible, including configurations where the textured region 115 is an internal region of the translucent layer 116 and the external surface 119a exhibits a substantially smooth contour.

It will be appreciated that while the light path L3 is shown extending through a particular one of the group of illuminable features 172, the light path L3 may extend through substantially any (or all) of the group of illuminable features 172. This may allow the dynamic input region 128 to define the active input area 150 at various positions along the exterior surface 119a of the translucent layer 116. For example, the light-emitting element 160 may substantially illuminate the entire light control layer 170, and the group of illuminable features 172 may be selectively actuated such that light propagates through particular ones of the group of illuminable features 172 and defines a desired symbol or visual output on the exterior surface 119a of the translucent layer 116. In other embodiments, the active input area 150 and/or various visual outputs may be defined by the group of illuminable features 172, for example, as may be the case when the group of illuminable features 172 are microperforations and the light-emitting element is, or forms a component of, an LED backlight.

The light path L3 may also traverse multiple other translucent layers. For example, the electronic device 104 may include an optical diffuser 174. The optical diffuser 174 may be positioned between the light-emitting element 160 and the light control layer 170 such that the light path L3 traverses the optical diffuser 174. The optical diffuser 174 may, in some embodiments, spread or scatter light received from the light-emitting element 160. This may allow the dynamic input region 128 to be illuminated with soft or diffuse light. This may be beneficial for generating various optical effects on the exterior surface 119a defined by the translucent layer 116. For example, soft light may be preferred in various settings having low or dim ambient lighting conditions.

Further, as shown in the embodiment of FIG. 2B, the electronic device 104 may optionally include one or more intermediate layers positioned along the light control layer 170. For example, as shown in FIG. 2B, the electronic device 104 may include intermediate layers 171a, 171b. The intermediate layer 171a may be positioned between the translucent layer 116 and the light control layer 170. The intermediate layer 171b may be positioned along the light control layer 170 opposite the first intermediate layer 171a. The intermediate layers 171a, 171b may provide a moisture barrier or other transitional layer between one or more of the components of the electronic device 104. The intermediate layers 171a, 171b may be translucent. This may allow light generated by the light-emitting element 160 (for example, such as that along light path L3) to propagate through the group of illuminable features 172 and illuminate the active input area 150 on the translucent layer 116. The intermediate layers 171a, 171b may be formed from, or include, polyethylene terephthalate (PET), silicon, glass sheet, ceramic sheet, or the like; however, other materials are possible, including plastics, synthetics, composites, and so on.

The sensing element 164 and the haptic structure 168, described with respect to FIG. 2A, are depicted in FIG. 2B positioned below the light-emitting element 160. However, it will be appreciated that the sensing element 164 and the haptic structure 168 may be arranged within the dynamic input region 128 in any appropriate configuration.

Figure 2C:
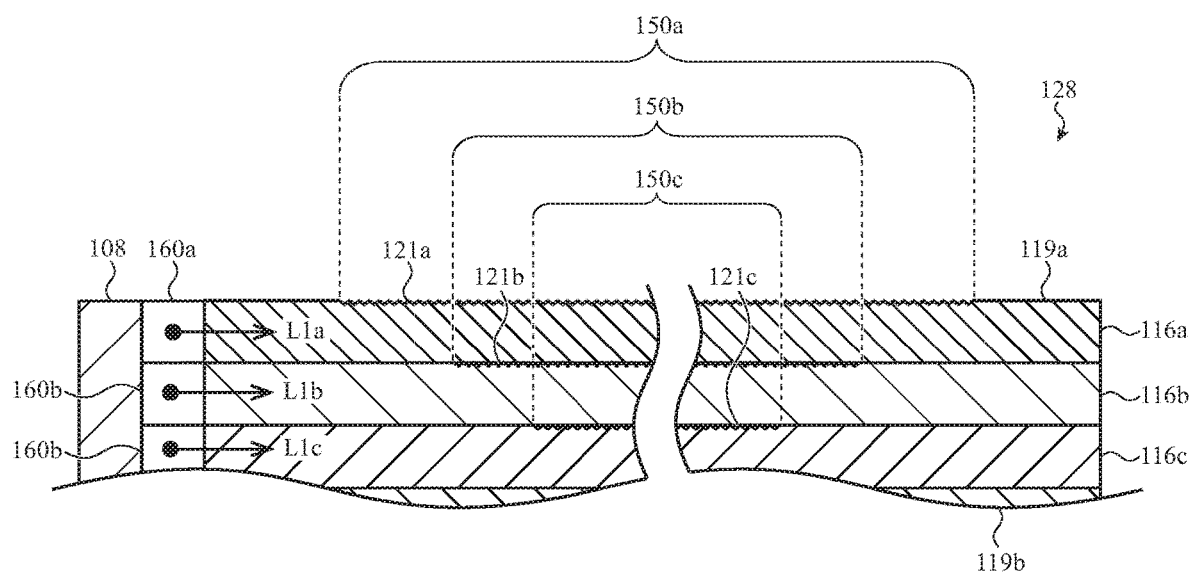
FIG. 2C depicts a cross-sectional view of the dynamic input region of FIG. 1A, taken along line B-B of FIG. 1A.

With reference to FIG. 2C, a side-illuminated embodiment is shown having multiple stacked layers that cooperate to produce a dynamic or configurable visual output. In particular, the dynamic input region 128 is shown in an embodiment in which the translucent layer 116, described above with respect to FIG. 2A, includes multiple distinct translucent layers. Each of the distinct translucent layers may define an individual light guide that is configured to channel light along a length of the exterior surface 119a. This may allow the dynamic input region 128 to illuminate active input areas having distinct sizes, shapes, and other optical effects.

As shown in the embodiment of FIG. 2C, the electronic device 104 includes a first translucent layer 116a, a second translucent layer 116b, and a third translucent layer 116c. The first translucent layer 116a may define the exterior surface 119a and the third translucent layer 116c may define the underside surface 119b. However, in other cases, the translucent layers 116a-116c may be positioned substantially within the device enclosure, and thus need not necessarily form the exterior surface 119a. Each of the translucent layers 116a-116c may be vertically stacked relative to one another on the exterior surface 119a; however, in other embodiments, other configurations are possible, including configurations in which one or more of the translucent layers 116a-116c are separated from one another within the enclosure 108. Each of the translucent layers 116a-116c may include light-extraction features configured to extract light and illuminate a corresponding active input area, as described below.

Each of the translucent layers 116a-116c may be coupled with a distinct light-emitting element and be used to illuminate distinct visible boundaries of an active input area within the dynamic input region 128. For example, the electronic device 104 may include a light-emitting element 160a optically coupled along an end of the translucent layer 116a. The light-emitting element 160a may be configured to emit light into a body or thickness of the translucent layer 116a such that light is propagated substantially along a light path L1a. The translucent layer 116a may include light-extraction features 121a that redirects light of light path L1a toward the exterior surface 119a. Further, the electronic device 104 may include a light-emitting element 160b optically coupled along an end of the translucent layer 116b. The light-emitting element 160b may be configured to emit light into a body or thickness of the translucent layer 116b such that light is propagated substantially along a light path L1b. The translucent layer 116b may include light-extraction features 121b that redirects light of light path L1b toward the exterior surface 119a. And further, the electronic device 104 may include a light-emitting element 160c optically coupled along an end of the translucent layer 116c. The light-emitting element 160c may be configured to emit light into a body of thickness of the translucent layer 116c such that light is propagated substantially along a light path L1C. The translucent layer 116c may include light-extraction features 121c that redirects light of light path L1C toward the exterior surface 119a. It will be appreciated that the three distinct translucent layers are shown in FIG. 2C for purposes of illustration only. In other embodiments, more or fewer translucent layers may be used, as may be appropriate for a given application.

Broadly, each of the translucent layers 116a-116c may be used to illuminate the exterior surface 119a within the dynamic input region 128. The illumination of the exterior surface 119a may correspond to distinct active input areas within the dynamic input region 128. For example, when illuminated, the first translucent layer 116a may define a first active input area 150a on the exterior surface 119a using the light-extraction features 121a, the second translucent layer 116b may define a second active input area 150b on the exterior surface 119a using the light-extraction features 121b, and the third translucent layer 116c may define a third active input area 150c on the exterior surface 119a using the light-extraction features 121c. The active input areas 150a-150c may correspond to a specified region or area of the dynamic input region 128 configured to receive an input and control a function of the electronic device 104. In this regard, various sensing elements (not shown in FIG. 2C) may be configured to detect input within the respective ones of the active input areas 150a-150c when illuminated. As shown in FIG. 2C, the active input areas 150a-150c may overlap one another.

Additionally or alternatively, the translucent layers 116a-116c may be used to produce various optical effects or visual outputs within the dynamic input region 128. For example, multiple ones of the translucent layers 116a-116c may be illuminated concurrently or in a particular pattern or sequence in order to visually emphasize selective portions of an active input area or otherwise produce a visual output along the exterior surface 119a. To illustrate, the light-emitting element 160a may be illuminated and define a boundary of the active input area 150a within the dynamic input region 128. While the active input area 150a is illuminated, the light-emitting elements 160*b*, 160*c* may be subsequently illuminated. This may create various optical effects within the active input area 150*a*, for example, such as illuminating a center or a periphery of the active input area 150*a* in distinct manners. For example, the active input area 150*a* may be illuminated more intensely (or with different colors) in a center portion as opposed to a periphery. In a center portion, the active input area 150*a* may be illuminated from light propagated by each of the translucent layers 116*a*-116*c*, whereas the periphery of the active input area 150 may be illuminated by light from only the translucent layer 116*a* (defining a boundary of the active input area 150*a*). The translucent layers 116*a*-116*c* may also be illuminated in a sequence to show an active input area expanding or contracting within the dynamic input region 128 (e.g., as described in greater detail below with respect to FIG. 3C).

Figure 2D:
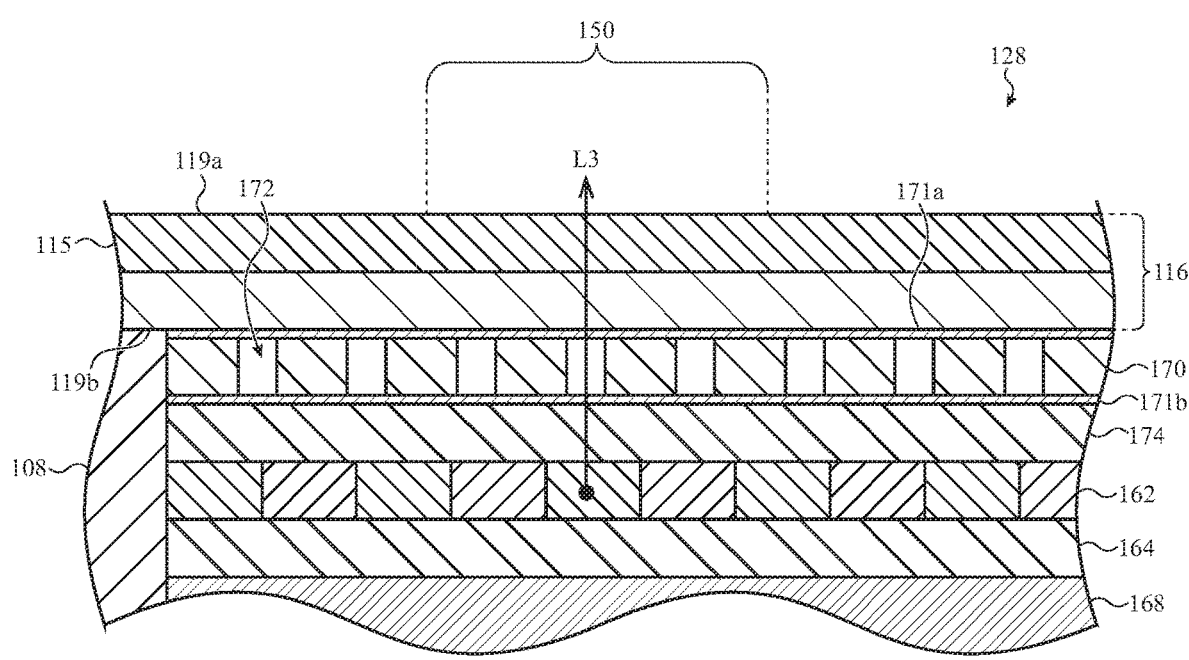
FIG. 2D depicts a cross-sectional view of the dynamic input region of FIG. 1A, taken along line B-B of FIG. 1A.

With reference to FIG. 2D, a bottom-illuminated embodiment is shown. In particular, the dynamic input region 128 is shown in an embodiment in which a group of light-emitting elements is used to selectively illuminate the exterior surface 119*a* of the translucent layer 116. This may allow the dynamic input region 128 to include a customizable or dynamic active input area illuminated on the exterior surface 119*a*. The selective illumination of the exterior surface 119*a* may also be used to produce various visual outputs, described herein, including updateable or dynamic visual output of the electronic device 104.

In this regard, the electronic device 104 may include a group of light-emitting elements 162. The group of light-emitting elements 162 may be a matrix of LEDs or other structures having individually actuatable light sources. The group of light-emitting elements 162 may be used to illuminate particular ones of the group of illuminable features 172, which, in turn, may illuminate the active input area 150 or visual output of the dynamic input region 128. For example, a first subset of the group of light-emitting elements 162 may be used to illuminate a first subset of the group of illuminable features 172. The first subset of the group of illuminable features 172, when illuminated, may define a first visible boundary of the active input area 150 on the exterior surface 119*a*. Further, a second subset of the group of light-emitting elements 162 may be used to illuminate a second subset of the group of illuminable features 172. The second subset of the group of illuminable features 172, when illuminated, may define a second visible boundary of the active input area 150 on the exterior surface 119*a*. The particular area or portion of the exterior surface 119*a* that defines the active input area 150 within the dynamic input region 128 may therefore change, and the group of light-emitting elements 162 may visually represent this change to the user by illuminating the translucent layer 116 accordingly. The first and second visible boundaries need not be distinct or separate portions of the translucent layer 116, however. In some cases, at least some of the illuminated indicators may be included in both the first and the second subsets of the group of illuminable features 172.

Figure 2E:
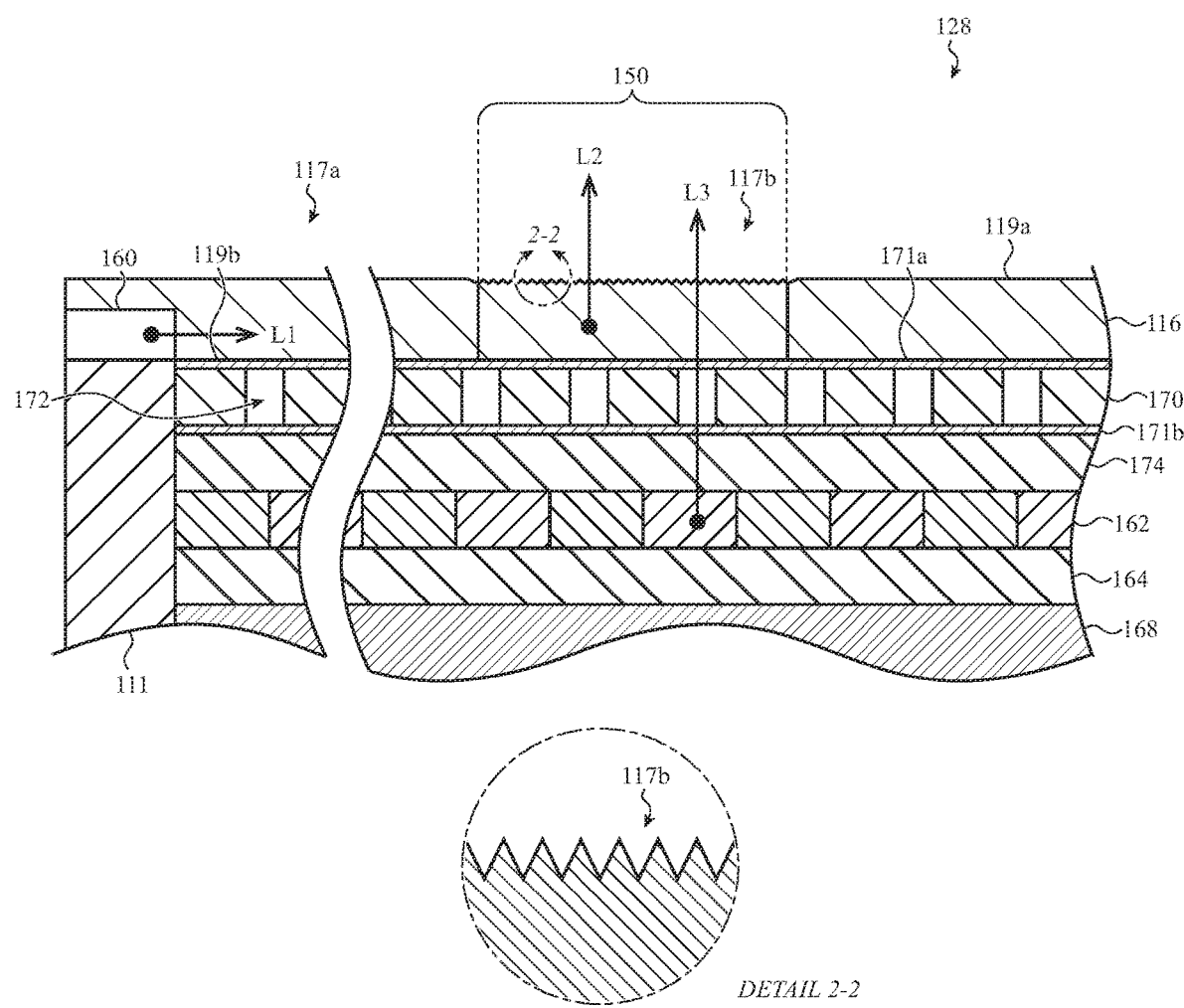
FIG. 2E depicts a cross-sectional view of the dynamic input region of FIG. 1A, taken along line B-B of FIG. 1A.

With reference to FIG. 2E, an embodiment is shown in which the translucent layer 116 is illuminated from both the side and the bottom. In particular, the dynamic input region 128 is shown in an embodiment in which the translucent layer 116 both defines a light guide and is selectively illuminated from within the enclosure 108. In particular, substantially analogous to the embodiment described with respect to FIG. 2A, the translucent layer 116 may include an internal reflection region 117*a* and light-extraction features 117*b*. Light from the light-emitting element 160 may propagate along the light path L1 through the internal reflection region 117*a* and toward the light-extraction features 117*b*. At the light-extraction features 117*b*, light may be redirected and expelled from the translucent layer 116, substantially along light path L2. This may illuminate, for example, a boundary of the active input area 150.

The group of light-emitting elements 162, arranged below the translucent layer 116 and the light control layer 170, may be configured to further illuminate the exterior surface 119*a*. As described above with respect to FIG. 2D, the group of light-emitting elements 162 may selectively illuminate particular ones of the group of illuminable features 172 in order to produce a visual effect or other visual output on the exterior surface 119*a*. As shown in FIG. 3, for example, the group of light-emitting elements 162 may generally propagate light along light path L3, toward exterior surface 119*a*.

The group of light-emitting elements 162 may augment the illumination of the active input area 150, which may be defined by the illuminated light-extraction features 117*b*. For example, the group of light-emitting elements 162 may be used to produce a visual output within the active input area 150 when the light-extraction features 117*b* is illuminated by the light-emitting element 160. The visual output may correspond to a visual indication of a position or a magnitude of a force or touch input received within the active input area 150. The visual output may also correspond to an output of the electronic device 104, such as a symbol corresponding to a battery depletion level of the electronic device 104. In other cases, the visual output may be illuminated within the dynamic input region 128 and outside of active input area 150. This may be beneficial in order to illuminate a visual output of the electronic device 104 within the dynamic input region adjacent or otherwise proximate to the active input area 150 on the exterior surface 119*a*. In other embodiments, other visual outputs are contemplated and described in greater detail below.

Figure 2F:
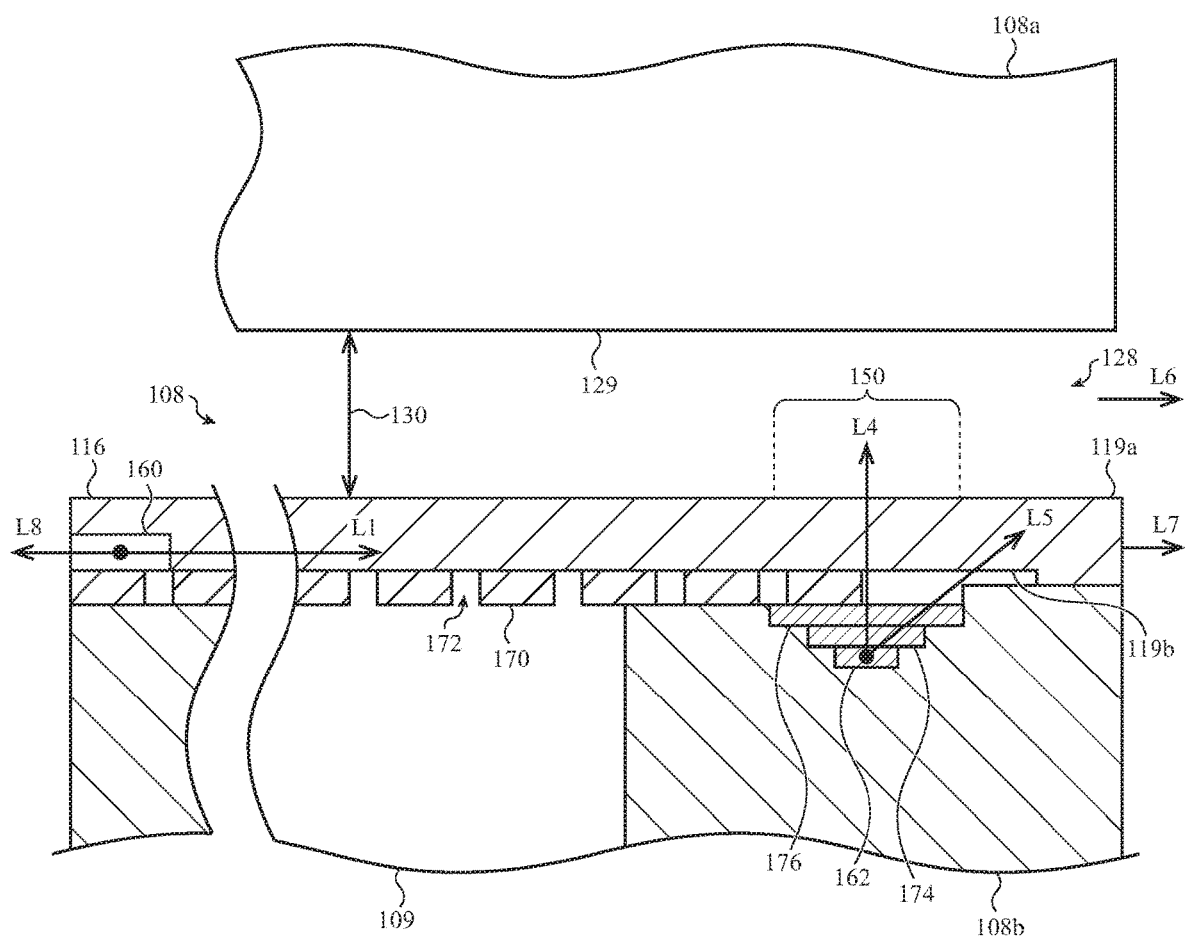
FIG. 2F depicts a cross-sectional view of the dynamic input region of FIG. 1A, taken along line B-B of FIG. 1A.

With reference to FIG. 2F, the electronic device 104 is shown in a configuration in which visual outputs may be produced when the electronic device 104 is in a closed configuration. For example, the translucent layer 116 may be illuminated such that the dynamic input region 128 and/or the active input area 150 may be at least partially visually perceptible when the electronic device 104 is in a closed configuration, as described herein. This may allow a user to view an active input area and/or visual output of the dynamic input region 128 when the upper enclosure 108*a* and the lower enclosure 108*b* are positioned substantially parallel or aligned with one another or the electronic device 104 is otherwise in a standby, sleep, or low-power mode. Further, information may be conveyed to the user regarding a status of the electronic device 104 (e.g., such as a battery depletion level, a wireless signal, and so on), without the user opening the electronic device 104 or otherwise causing the electronic device 104 to enter a full power mode.

To facilitate the foregoing, a periphery of the exterior surface 119*a* may be illuminated. For example, the electronic device 104 may include the group of light-emitting elements 162 arranged below the exterior surface 119*a* and along a periphery of the translucent layer 116. The group of light-emitting elements 162 may be a strip of LEDs or micro-LEDs that extend along a side of the enclosure 108; however, in other cases, other illumination structures are possible. The group of light-emitting elements 162 may be selectively controllable to propagate light along light paths L4A, L5, described herein. Additionally or alternatively, the periphery of the exterior surface 119*a* may be illuminated by a light source 160 positioned along a side of the translucent layer 116. The light source 160 may be configured to propagate light along light path L1, through the translucent layer 116, for example, substantially analogous to the light path L1 described with response to FIG. 2A.

In a particular embodiment, an optical diffuser 174 may be arranged within the enclosure 108 substantially along the group of light-emitting elements 162. The group of light-emitting elements 162 may propagate through the optical diffuser 174 and toward the translucent layer 116. The group of light-emitting elements 162 may selectively propagate light along multiple directions into the diffuser, such as along a light path L4 and a light path L5, depicted in FIG. 2F. Light path L4 may extend along a direction substantially perpendicular to the exterior surface 119*a*, whereas the light path L5 may extend along a direction angled with respect to the exterior surface 119*a* and optionally couple with the translucent layer 116. The distinct light paths L4, L5 may allow a user to view information depicted within the dynamic input region 128 when the electronic device is in a closed configuration. For example, light may propagate along light path L4 and into the gap 130. In the gap 130, light from light path L4 may reflect or scatter, and produce light path L6, which may be visible when the electronic device 104 is in the closed configuration. Additionally or alternatively, light may propagate along light path L5 and into the translucent layer 116. Light from light path L5 may internally reflect within the translucent layer 116 and produce light path L7, which may be visible when the electronic device 104 is in a closed configuration. Light may also be visible when the electronic device 104 is closed using various light-emitting elements (e.g., light-emitting element 160) arranged along an edge. For example, as shown in FIG. 2F, the light-emitting element 160 may propagate light along light path L8, which may extend from an edge or periphery of the enclosure.

It will be appreciated that the various light path described herein are depicted for purposes of illustration only. Rather than suggest all the light travels exclusively along a particular light path, the illustrated light paths are depicted to be a representation of diffuse light. Accordingly, light may propagate from the light-emitting element 160 and/or group of light-emitting elements 162 along directions other than those shown by those depicted in the figures.

The electronic device 104 may optionally include an intermediate optical layer 176. The intermediate optical layer 176 may be another optical diffuser configured to further diffuse or scatter light. This may help condition or otherwise soften light expelled from the exterior surface 119*a*. The intermediate optical layer 176 may also be an optical filter or other layer that selectively transmits light at various different wavelengths. This may help illuminate the exterior surface 119*a* with a specified color, for example.

In one embodiment, light propagated along the light path L4 may extend through the light control layer 170 and illuminate, for example, the active input area 150 within the dynamic input region 128. Light propagated along the light path L5 need not necessarily pass through the light control layer 170. In some cases, the light propagated along the light path L5 may extend angularly through the translucent layer 116 and away from the electronic device 104. It will be appreciated that light from the group of light-emitting elements 162 may be configured to selectively propagate light along one or both of the light path L4 and/or L5, as may be appropriate for a given configuration.

As shown in FIG. 2F, the electronic device 104 may be a closed configuration. For example, the upper enclosure 108*a* and the lower enclosure 108*b* of the enclosure 108 may be positioned substantially parallel or otherwise aligned with one another. For example, the exterior surface 119*a* of the lower enclosure 108*b* and an exterior surface 129 of the upper enclosure 108*a* may be substantially parallel or otherwise aligned. In the closed configuration, the upper enclosure 108*a* and the lower enclosure 108*b* may be separated by a gap 130. The gap 130 is depicted in FIG. 2F for purposes of illustration and is not necessarily shown according to scale. In some cases, the gap 130 may be substantially smaller when the electronic device 104 is in the closed configuration, such as having a length of several millimeters or several centimeters.

The group of light-emitting elements 162 may be configured to illuminate the active input area 150 and/or a visual output within the dynamic input region 128 in a manner that is visually perceptible when the electronic device 104 is in a closed configuration. In particular, at least a portion of the active input area 150 and/or visual output illuminated on the translucent layer 116 may be visible through the gap 130 and/or a side or end of the translucent layer. For example, light propagated along the light path L4 may be at least partially visually perceptible to a user through the gap 130 (along light path L6). Additionally or alternatively, light propagated along the light path L5 may propagate through a side or end or the translucent layer 116 (along light path L7) and thus may be visually perceptible to a user when the electronic device 104 is in a closed configuration. This may be beneficial in order to convey information to a user regarding a status of the electronic device 104. As a non-limiting example, light propagated along one or both of the light paths L4 and/or L5 may correspond to a battery depletion level of the electronic device 104 (or other updateable or dynamic status of the electronic device 104). As such, the user may receive such information without needing to open the electronic device 104 and/or cause the electronic device 104 to enter a full power mode.

FIGS. 3A-7C generally describe various embodiments in which the translucent layer 116 may be illuminated, and the corresponding functions of the dynamic input region 128 for the various depicted illumination conditions. As described herein, the translucent layer 116 may be illuminated within the dynamic input region 128 to define various active input areas used to control a function of the electronic device 104. The translucent layer 116 may also be illuminated to depict a visual output within the dynamic input region 128. The visual output may be substantially any visual effect produced on the translucent layer 116. In some cases, the visual output may emphasize the active input area (including a boundary or portion of the active input area), a location of a touch contact, a path of travel of a touch contact, a manipulation of the active input area, a location of multiple distinct active input areas, and so on. The visual output, however, may not necessarily be associated with input or a request for input from the user. In some cases, the visual output may also be used to convey information relating to a status of the electronic device 104, including a notification or other static and/or dynamic indicator.

Figure 3A:
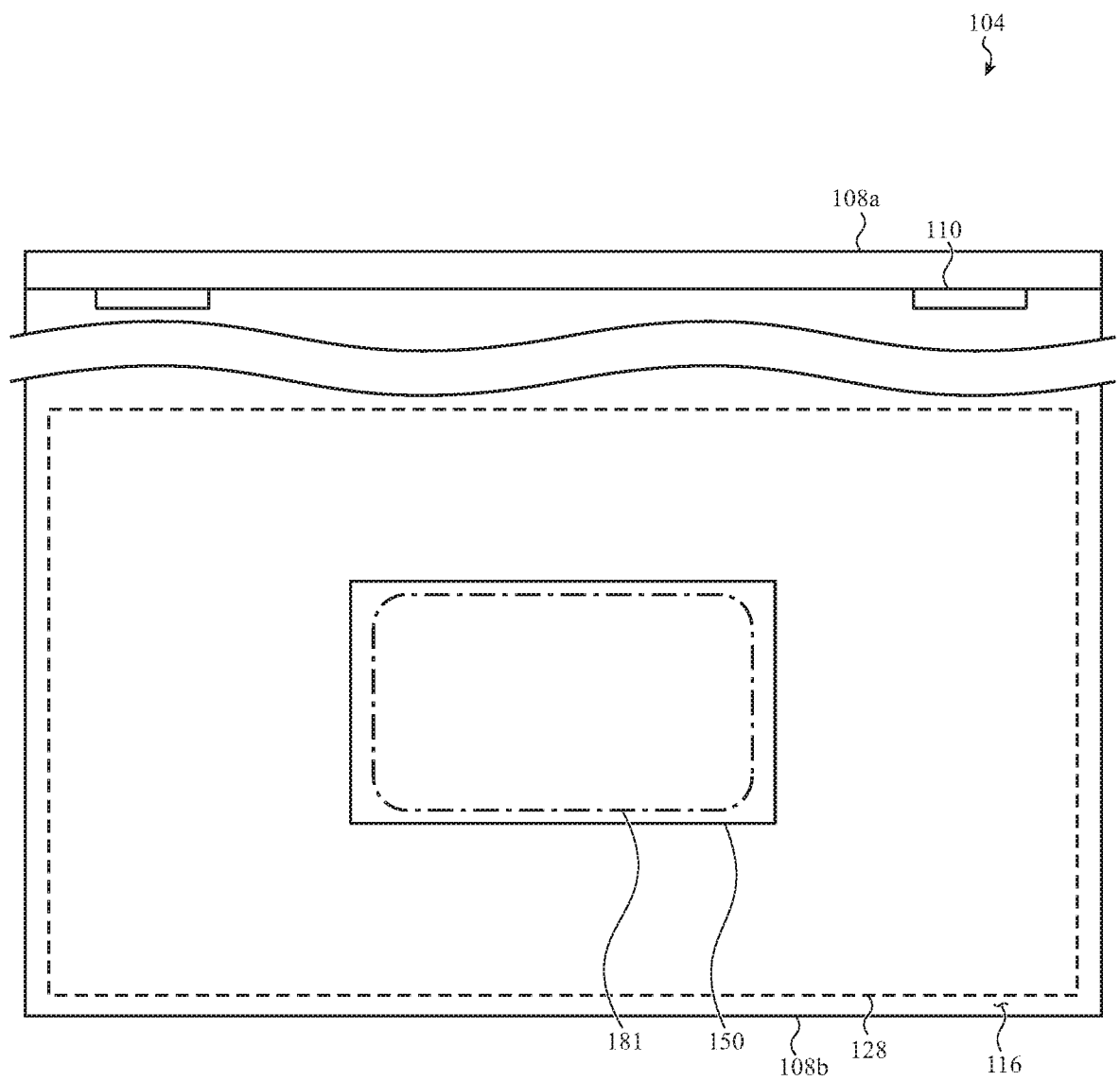
FIG. 3A depicts a top view of a sample electronic device having an active input area illuminated within a dynamic input region.
Figure 3B:
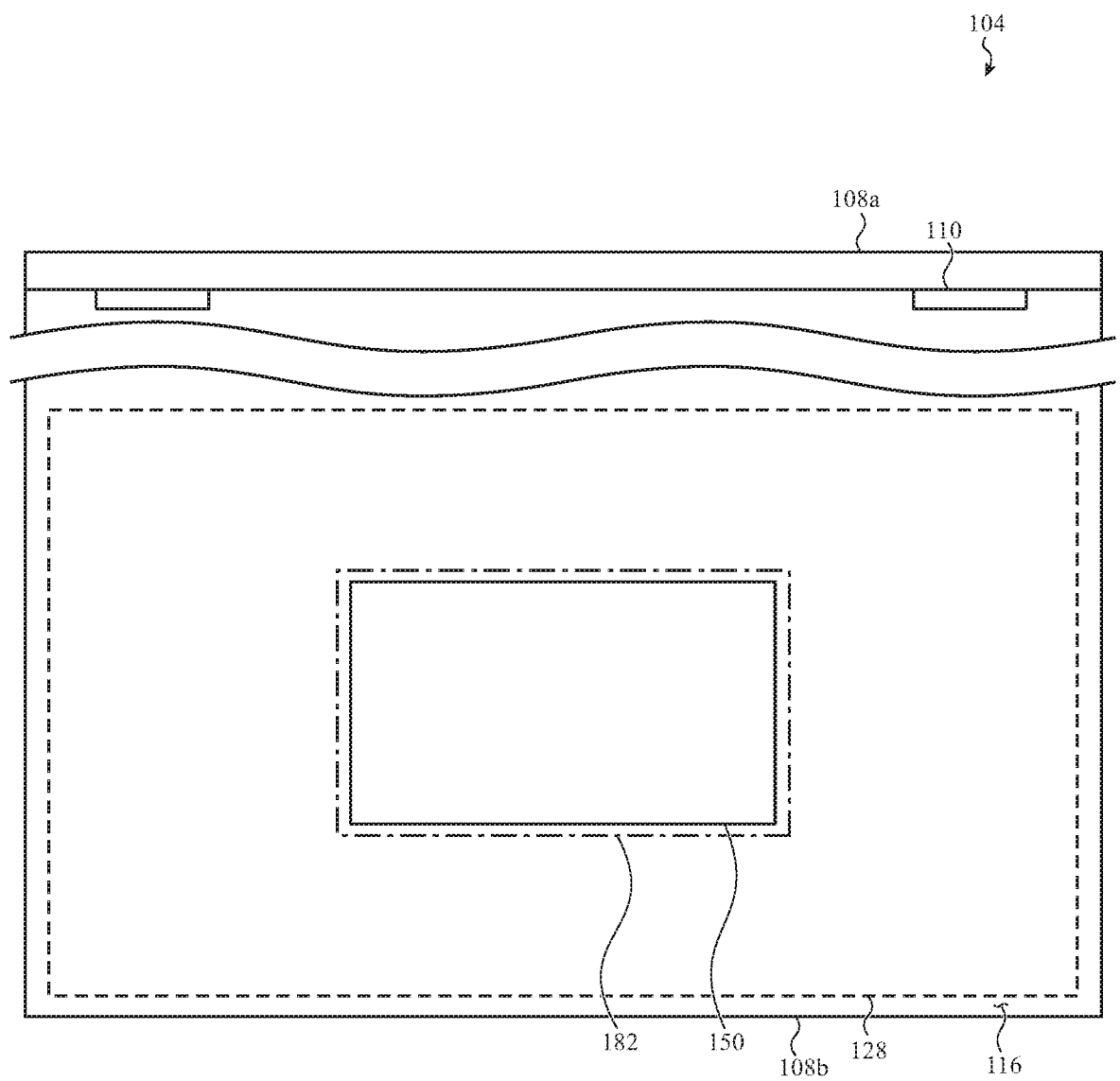
FIG. 3B depicts a top view of a sample electronic device having another embodiment of an active input area illuminated within a dynamic input region.
Figure 3C:
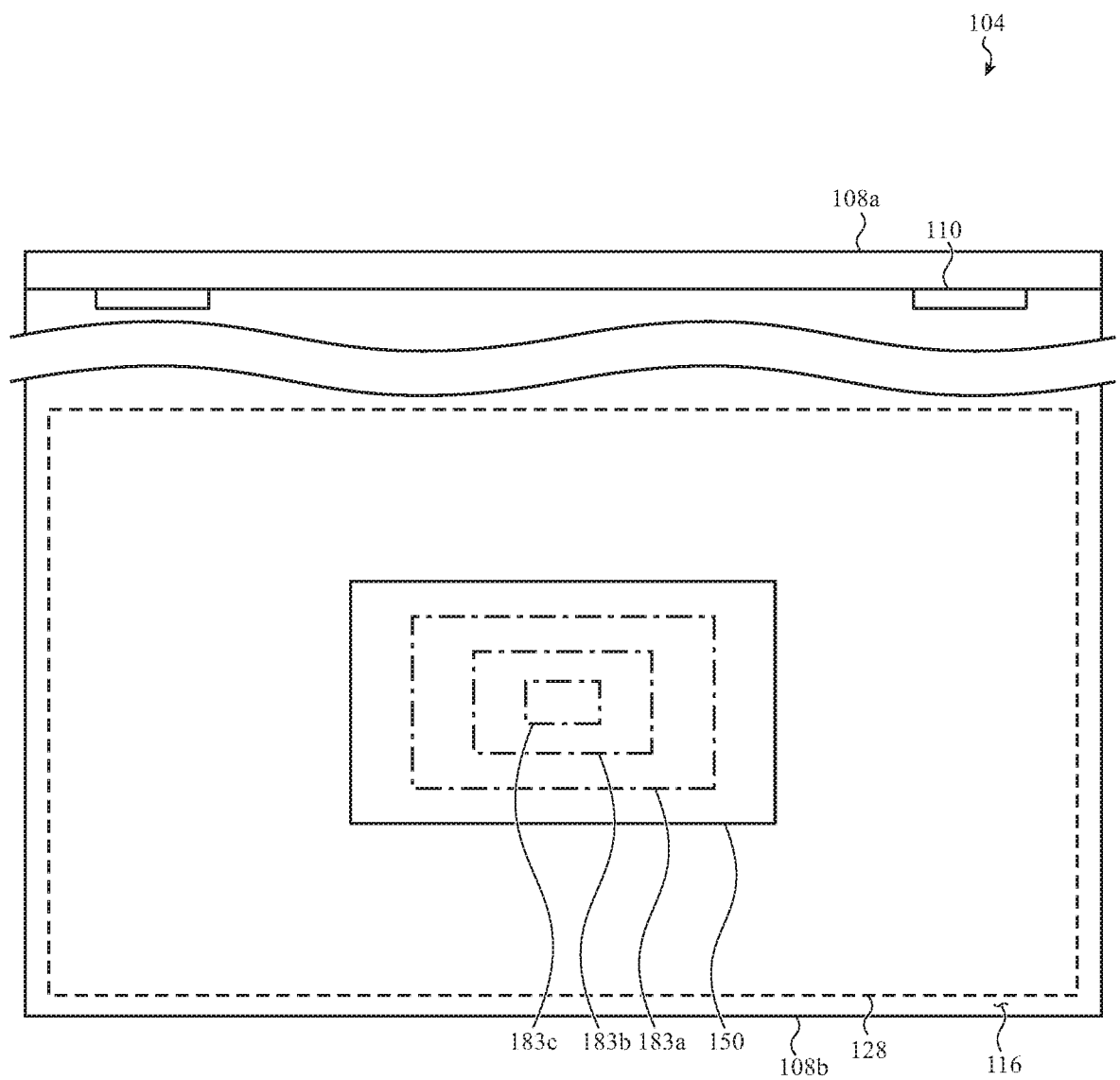
FIG. 3C depicts a top view of a sample electronic device having another embodiment of an active input area illuminated within a dynamic input region.

FIGS. 3A-3C show various visual outputs depicted within the dynamic input region 128 that may be used to visually emphasize the active input area 150. For example, the visual outputs may illuminate or emphasize a boundary (including a boundary thickness) of the active input area, a gradient, edge fade or taper, or other characteristic. In some cases, the visual output may be used to modify or manipulate an overall (or localized) brightness or color of the active input area 150.

With reference to FIG. 3A, the dynamic input region 128 is shown with a visual output 181 illuminated on the translucent layer 116. The visual output 181 may visually emphasize an inner periphery of the active input area 150. For example, the inner periphery of the active input area 150 may be illuminated differently than a center region of the active input area. This may be used to create various visual effects within the dynamic input region 128, such as modifying a gradient brightness or edge fade of the illuminated boundary of the active input area 150.

With reference to FIG. 3B, the dynamic input region 128 is shown with a visual output 182 illuminated on the translucent layer 116. The visual output 182 may visually emphasize a boundary of the active input area 150. For example, the visual output 182 may be a ring of various and user-customizable thicknesses that substantially surround the active input area 150.

With reference to FIG. 3C, the dynamic input region 128 is shown with a visual output 183a, a visual output 183b, and a visual output 183c optionally illuminated on the translucent layer 116. The visual outputs 183a-183c may correspond to distinct illuminated boundaries of the active input area 150. For example, various ones of the visual outputs 183a-183c may be illuminated concurrently or in a sequence to visually emphasize different areas that may be used to receive an input and control a function of the electronic device. Additionally or alternatively, the visual outputs 183a-183c may be illuminated in a sequence to show the active input area 150 expanding or contracting. For example, when the active input area 150 is initially defined or activated within the dynamic input region 128, the visual output 183c may be illuminated, followed by the visual output 183b, and subsequently the visual output 183a. This may give the appearance of an expanding active input area. The sequence may be reversed when the active input area 150 is turned off or otherwise deactivated. In one embodiment, each of the visual outputs 183a-183c may correspond to distinct light guide panels of the electronic device (e.g., such as those described with respect to FIG. 2C). However, in other cases, the visual outputs 183a-183c may be produced by various different light-emitting elements and indicators, as may be appropriate for a given application.

Figure 4A:
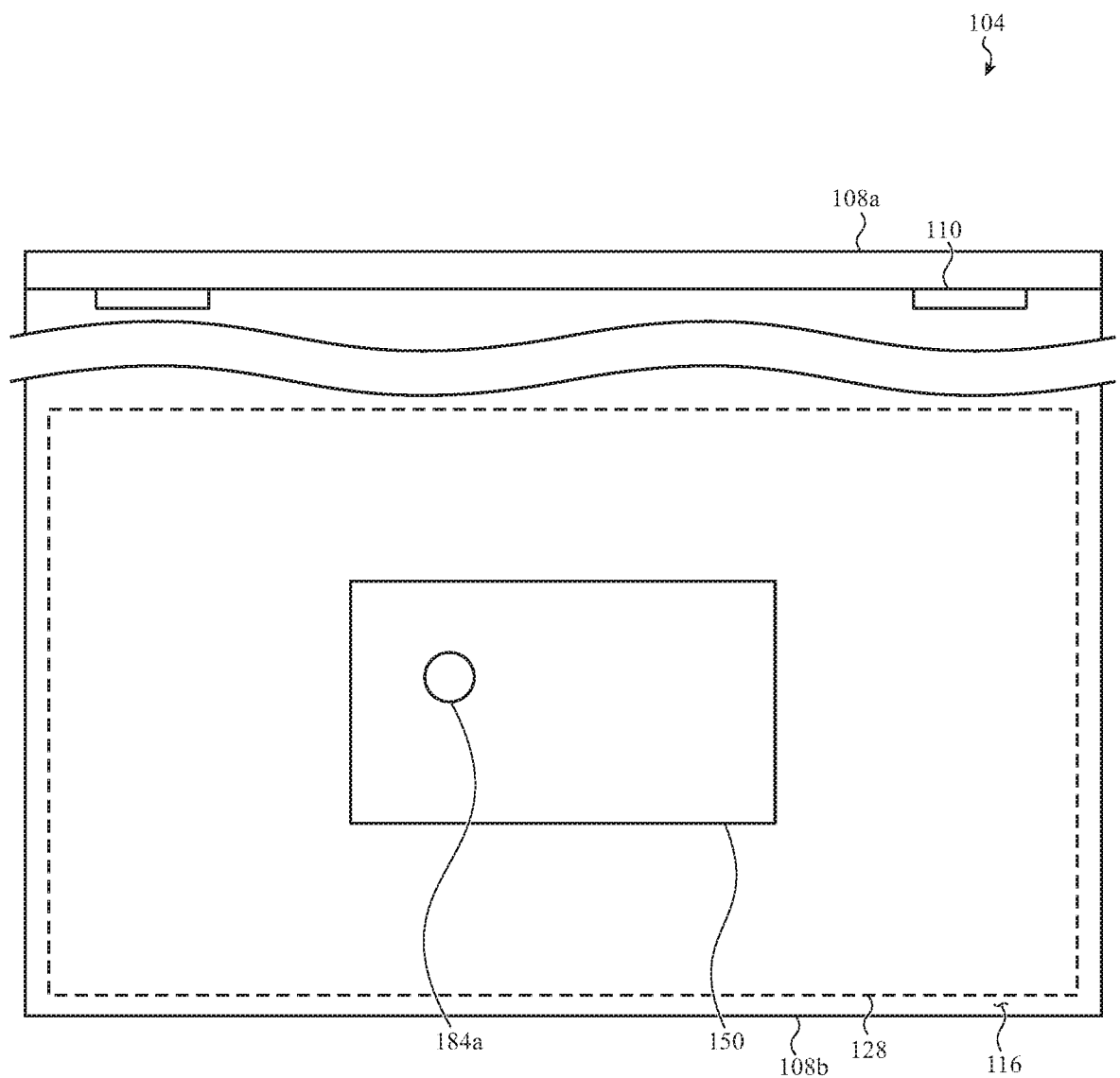
FIG. 4A depicts a top view of a sample electronic device having an active input area and a visual output illuminated within a dynamic input region.
Figure 4B:
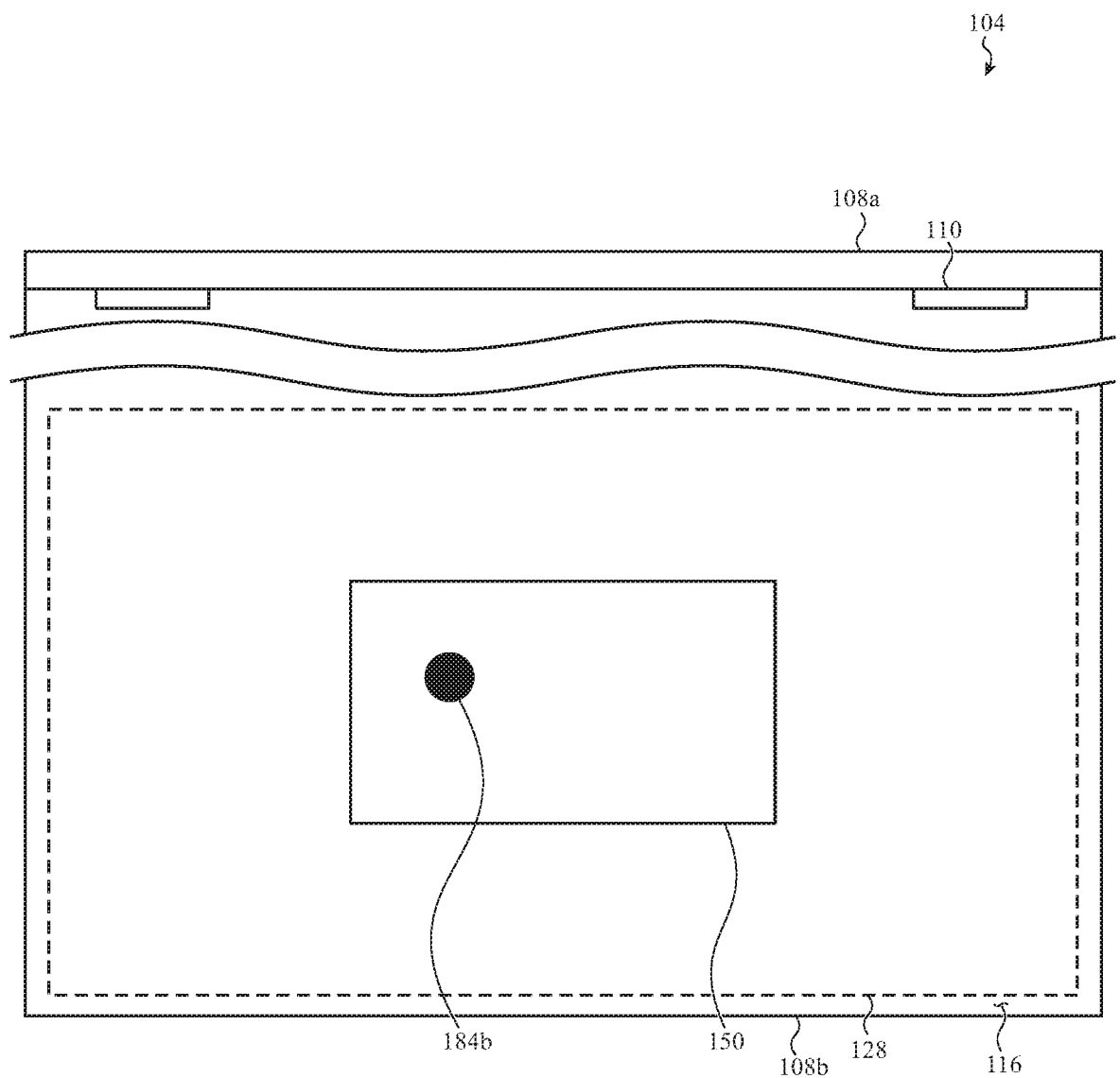
FIG. 4B depicts a top view of a sample electronic device having an active input area and another visual output illuminated within a dynamic input region.
Figure 4C:
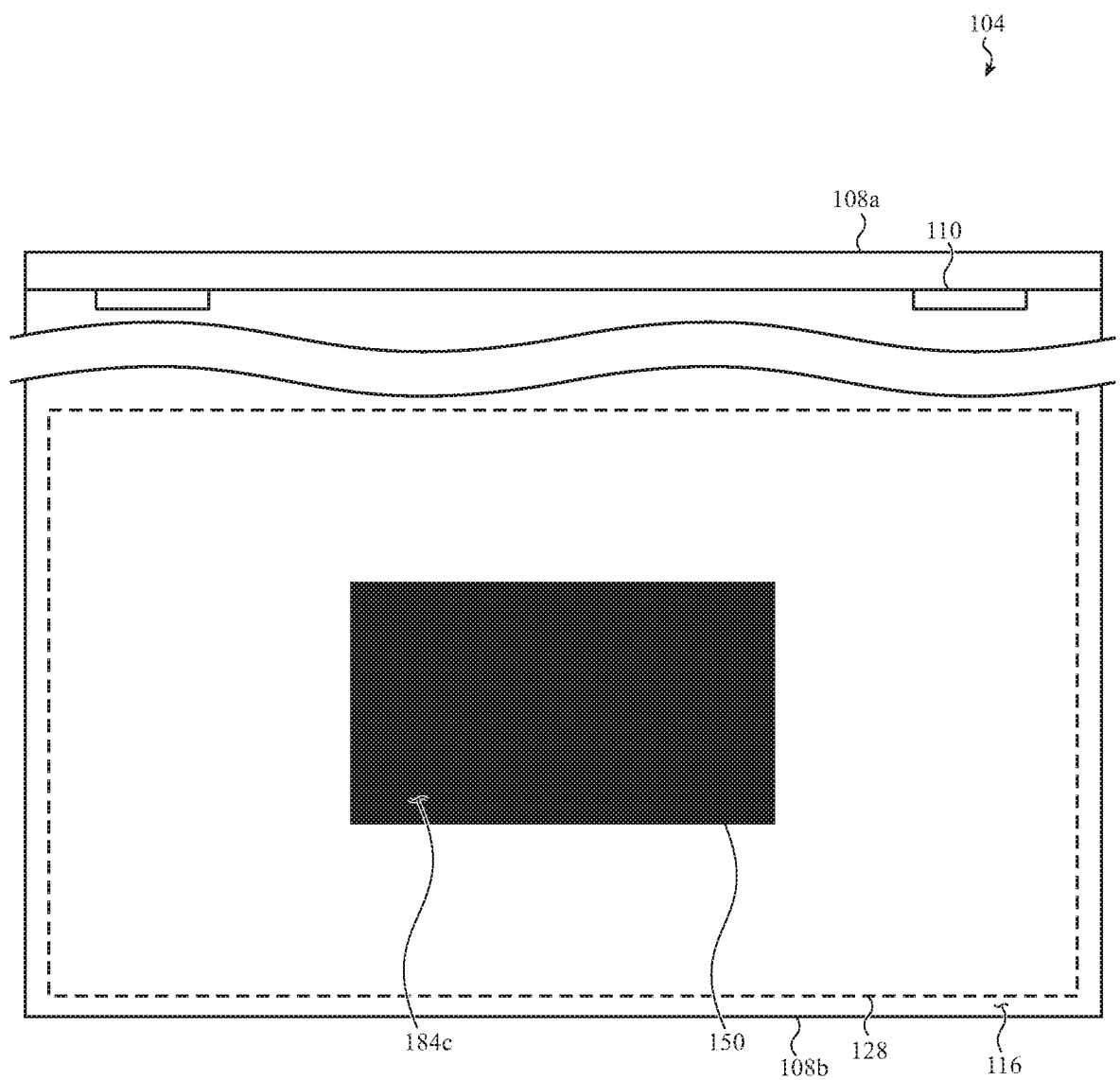
FIG. 4C depicts a top view of a sample electronic device having an active input area and another visual output illuminated within a dynamic input region.

FIGS. 4A-4C show various visual outputs depicted within the dynamic input region 128 that may be used to visually emphasize an input received along the dynamic input region 128. For example, the visual outputs may illuminate or emphasize a location or region of a touch input, force input, and/or proximity input. The visual outputs may also emphasize or be indicative of a magnitude or type of detected input. The visual output may thus provide a visual confirmation to the user that the electronic device 104 received the input from the user. The visual output may be depicted in response to input detected along the dynamic input region 128 and/or in response to a signal from a component or assembly of the electronic device 104 (e.g., a processing unit, antenna, and so on).

With reference to FIG. 4A, the dynamic input region 128 is shown with a visual output 184a illuminated on the translucent layer 116. The visual output 184a may visually emphasize a boundary of an input received within the active input area 150. For example, the visual output 184a may be a boundary of a touch input, force input, and/or proximity input received within the active input area 150.

With reference to FIG. 4B, the dynamic input region is shown with a visual output 184b illuminated on the translucent layer 116. The visual output 184b may visually emphasize a location or contact area of an input received within the active input area 150. For example, the visual output 184b may be an illumination of a contact surface of a touch input, force input, and/or a proximity input.

With reference to FIG. 4C, the dynamic input region is shown with a visual output 184c illuminated on the translucent layer 116. The visual output 184c may visually emphasize the active input area in response to a received input. For example, the active input area 150 may be entirely illuminated (or illuminated in a different or distinct manner) in response to a touch input, force input, and/or proximity input received within the active input area 150. This may be a momentary illumination or a flash, in some cases.

Figure 5A:
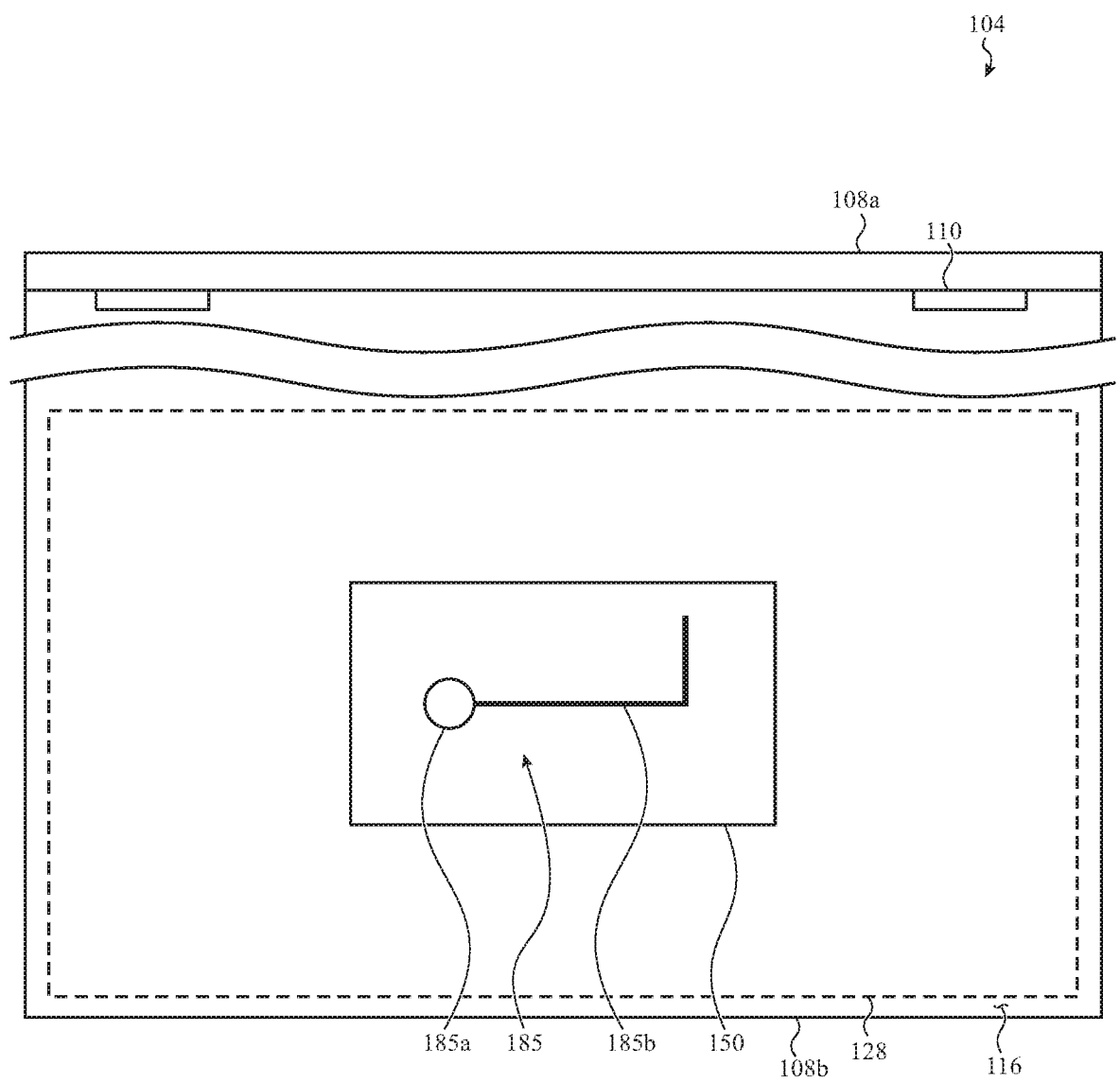
FIG. 5A depicts a top view of a sample electronic device having an active input area and a light trail illuminated within a dynamic input region.
Figure 5B:
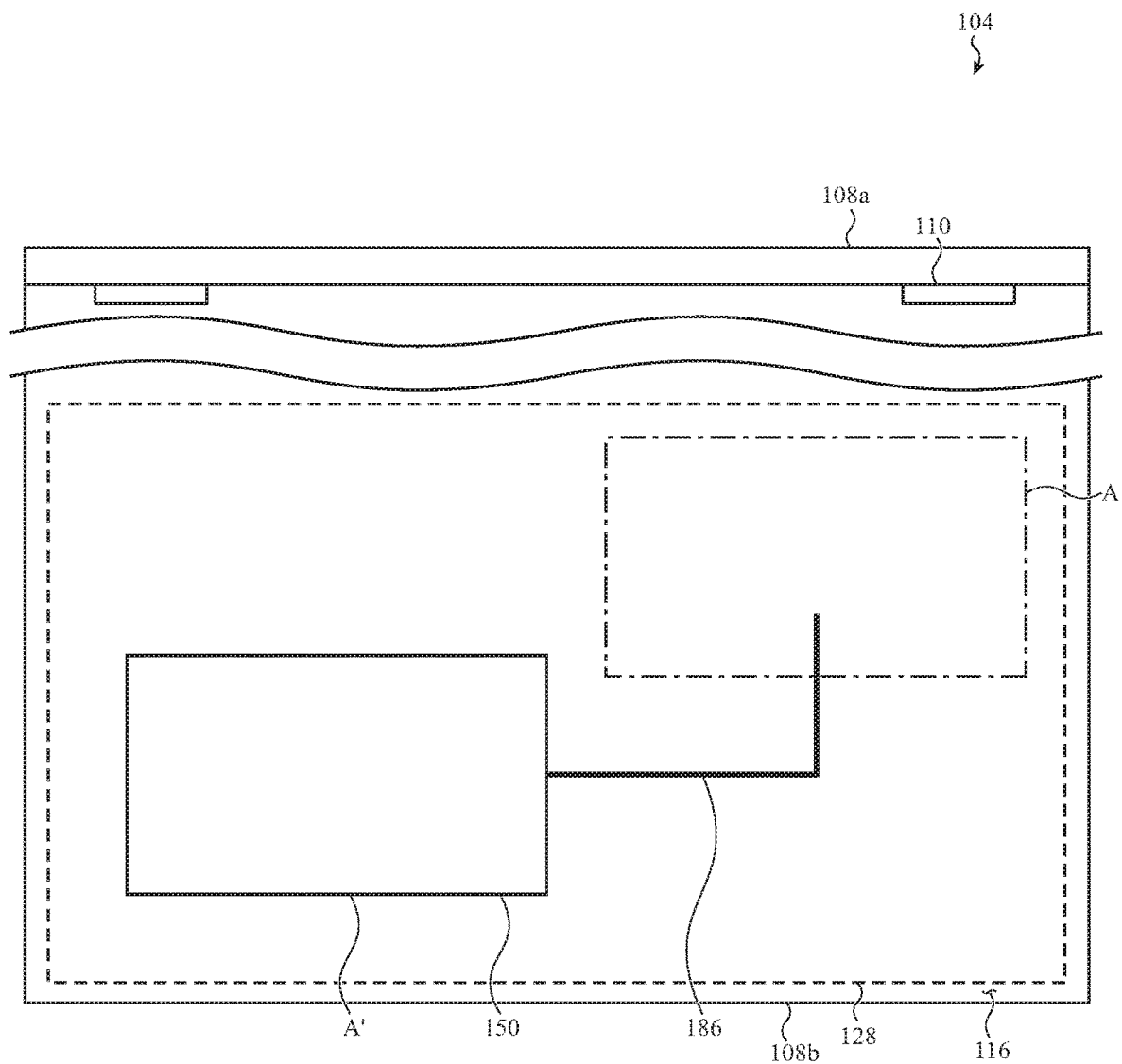
FIG. 5B depicts a top view of a sample electronic device having an active input area and another light trail illuminated within a dynamic input region.
Figure 5C:
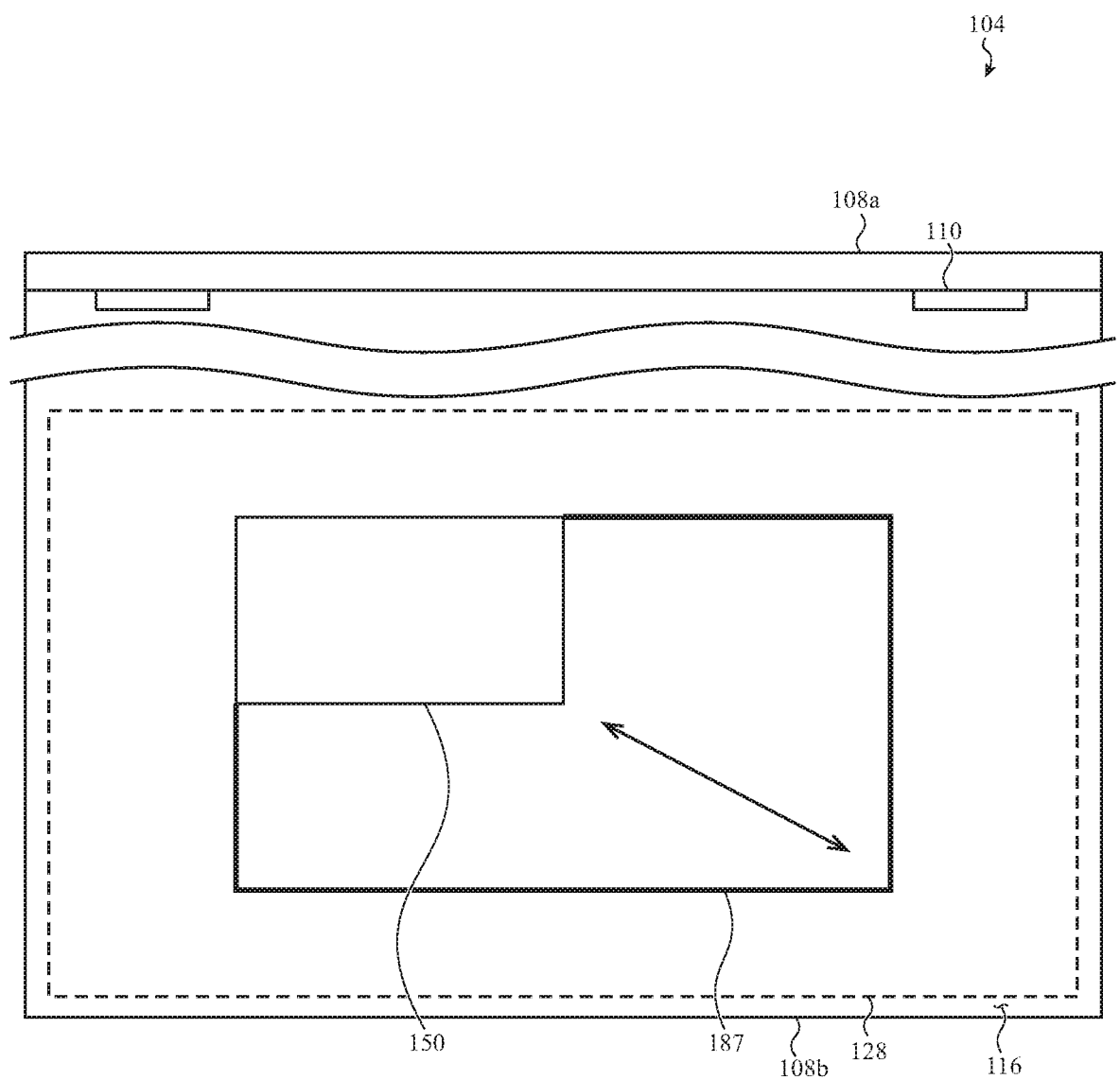
FIG. 5C depicts a top view of a sample electronic device having an active input area and another light trail illuminated within a dynamic input region.

FIGS. 5A-5C show various visual outputs depicted within the dynamic input region 128 that may be used to visually emphasize, broadly, recent activity or history of the dynamic input region 128. For example, the visual output may illuminate a light trail indicative of a path of travel of a user input (such as a path of travel for a swipe across a trackpad). Additionally or alternatively, the visual output may be indicative of a manipulation of the active input area 150 within the dynamic input region 128 (such as a resizing or repositioning of the active input area 150).

The visual output may be depicted on the dynamic input region 128 in response to a gesture. The gesture may include a user motion pattern, signs, finger or hand positions, or the like that are performed relative to the dynamic input region 128. The gesture may be used to manipulate the active input area 150 along the dynamic input region 128, and the visual output may depict the manipulation accordingly.

With reference to FIG. 5A, the dynamic input region 128 is shown with a visual output 185 illuminated on the translucent layer 116. The visual output 185 may visually emphasize a location and path of travel (recent movements) of an input received within the dynamic input region 128. In a sample embodiment, as shown in FIG. 5A, the visual output may include an input symbol 185a and a light trail 185b. The input symbol 185a may be a circle or other marker that may visually emphasize a location of the received input. The light trail 185b may be indicative of a path of travel or previous movement of the received input. To illustrate, the active input area 150 may be a trackpad and the light trail 185b may visually represent a swiping movement of a user across the translucent layer 116. The input symbol 185a may be a location where the swiping movement ceased, a location of where a different type of input was received (such as a force input or a click), or other characteristic of the received input.

With reference to FIG. 5B, the dynamic input region 128 is shown with a visual output 186 illuminated on the translucent layer 116. The visual output 186 may visually emphasize a manipulation of the active input area 150 within the dynamic input region 128. In particular, the visual output 186 may be a light trail indicative of a repositioning or path of travel of the active input area 150. For example, the visual output 186 may indicate that the active input area 150 moved from a first position A to a second position A' within the dynamic input region 128 and/or the path of travel of the active input area 150 between the first and second positions within the dynamic input region 128.

With reference to FIG. 5C, the dynamic input region 128 is shown with a visual output 187 illuminated on the translucent layer 116. The visual output 187 may visually emphasize a manipulation of the active input area 150 within the dynamic input region 128. In particular, the visual output 187 may show a previous and/or anticipated boundary of the active input area 150. For example, the active input area 150 may be resized to encompass a smaller or larger portion of the dynamic input region 128, as described herein. The visual output 187 may represent an anticipated larger boundary of the active input area 150 and/or may represent a previous boundary of the active input region, as may be appropriate for a given application.

Figure 6A:
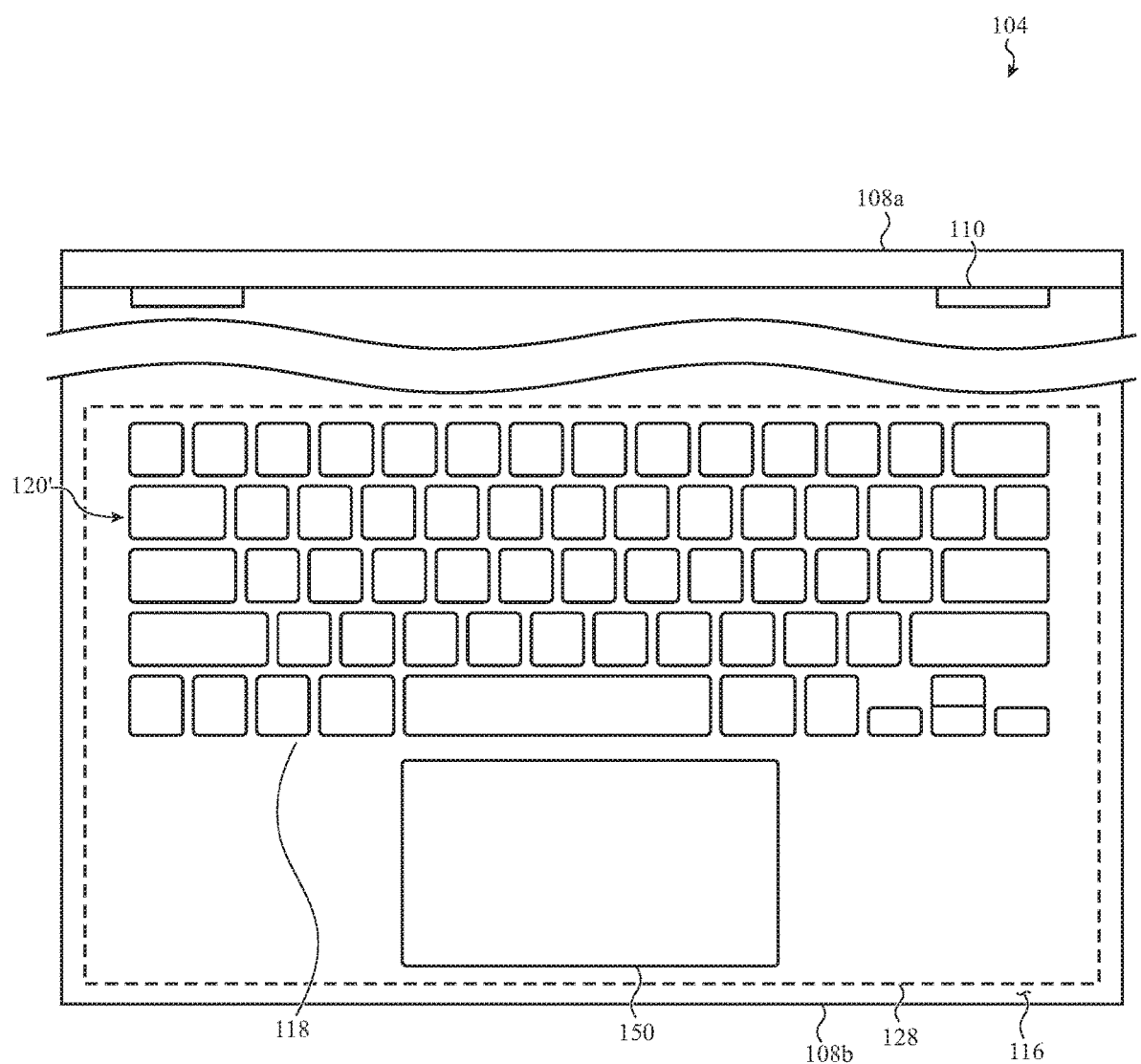
FIG. 6A depicts a top view of a sample electronic device having a keyboard region and dynamic input region.
Figure 6B:
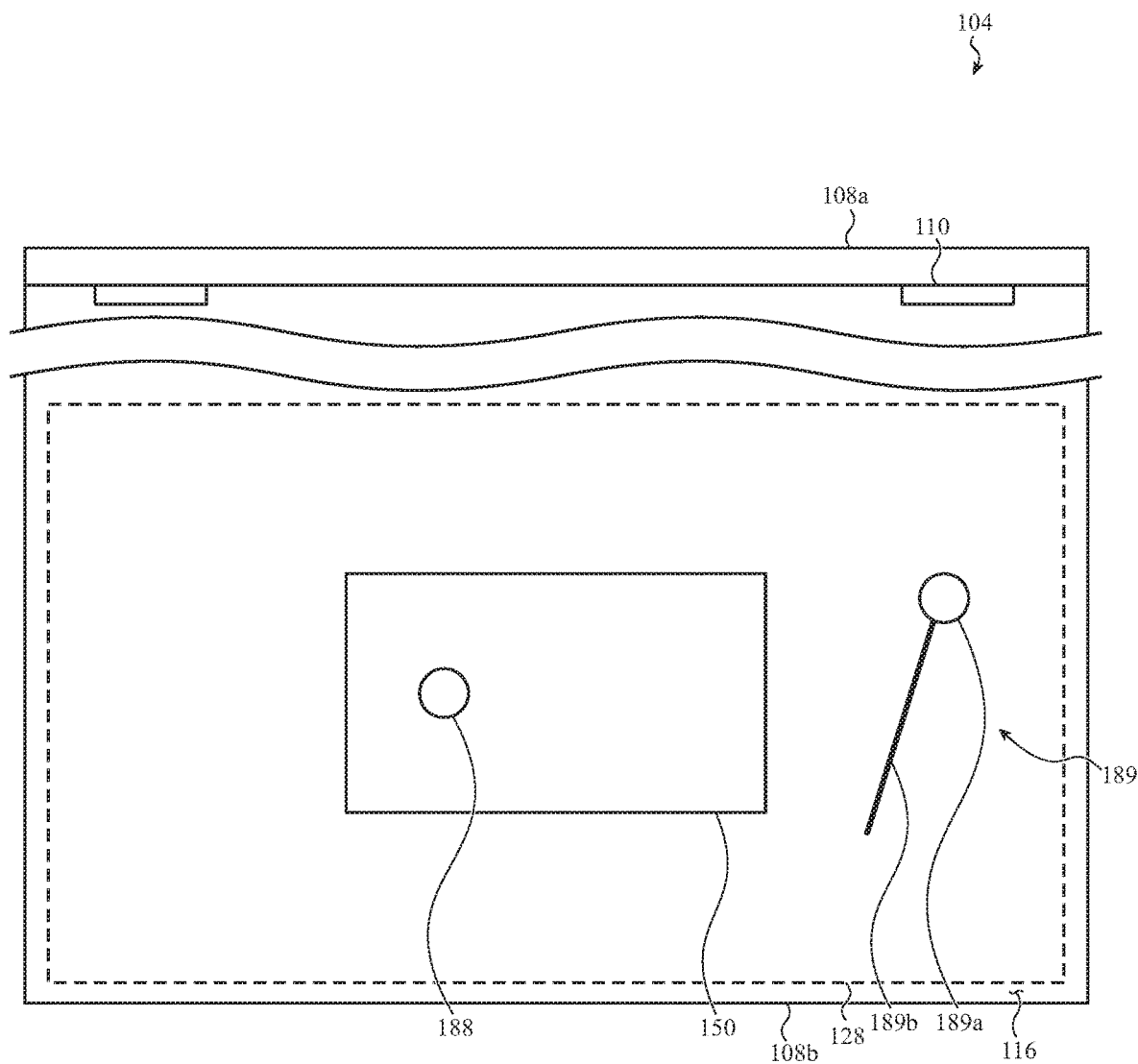
FIG. 6B depicts a top view of a sample electronic device having a dynamic input region configured to detect multiple inputs.

FIGS. 6A and 6B show various visual outputs depicted within the dynamic input region 128 that may be used to visually emphasize multiple active input regions. For example, the dynamic input region 128 may be configured to detect multiple inputs concurrently and/or otherwise be configured to control different functions of the electronic device 104 in response to input received at distinct areas of the translucent layer 116. The visual output may therefore signify to the user the presence of the various distinct input functionalities on the translucent layer 116.

With reference to FIG. 6A, a virtual keyboard 120' and the active input area 150 are illuminated within the dynamic input region 128. The virtual keyboard 120' may include a set of keys or key regions that are illuminated on the surface of the translucent layer 116. Each key or key region of the virtual keyboard 120' may be configured to detect an input along a key surface. The electronic device 104 may be responsive to the input received at each of the keys, for example, such as modifying or updating an output of a display based on detecting a keypress at particular keys of the virtual keyboard 120'. The active input area 150 may be illuminated on the translucent layer 116 proximate to or adjacent the illuminated keys. The electronic device 104 may be separately responsive to input received with the active input area. In this manner, the dynamic input region 128 may be used to define both a virtual or dynamic keyboard and trackpad, both of which may be customizable within the dynamic input region 128. For example, in response to an input, any of the illuminated keys and the trackpad may be moved, resized, or otherwise manipulated in or to accommodate various user preferences. The configuration shown in FIG. 6A may also allow the dynamic input region 128 to detect multi-input concurrently, such as detecting a keypress and a swipe along the trackpad at the same time or in rapid succession.

With reference to FIG. 6B, the dynamic input region 128 is shown with multiple visual outputs illuminated that may visually emphasize multiple inputs received along the dynamic input region 128. For example, a visual output 188 is shown illuminated within the active input area 150. The visual output 188 may correspond to a boundary of an input. Further, a visual output 189 is shown illuminated within the dynamic input region 128 and outside of the active input area 150. For example, as described herein, the dynamic input region 128 may be configured to receive an auxiliary input outside of the active input area 150. The auxiliary input received outside of the active input area 150 may control the electronic device 104 in a manner that is distinct from input received within the active input area 150. This may be beneficial, for example, where the active input area 150 defines a trackpad or button of the electronic device 104 and the dynamic input region 128 (outside of the active input area 150) is used to receive input from a stylus or other input involving motion across the translucent layer 116. In this regard, in one embodiment, the visual output may include an input symbol 189a and a light trail 189b. Substantially analogous to the embodiments described with respect to FIG. 5A, the input symbol 189a may correspond to a location of a received input and the light trail 189b may correspond to a path of travel of the input along the translucent layer 116. The input received within the active input area 150 (represented by the visual output 188) and the input received outside of the active input area 150 (represented by the visual output 189) may occur, and be detected and illuminated, concurrently; however, this is not required.

Figure 7A:
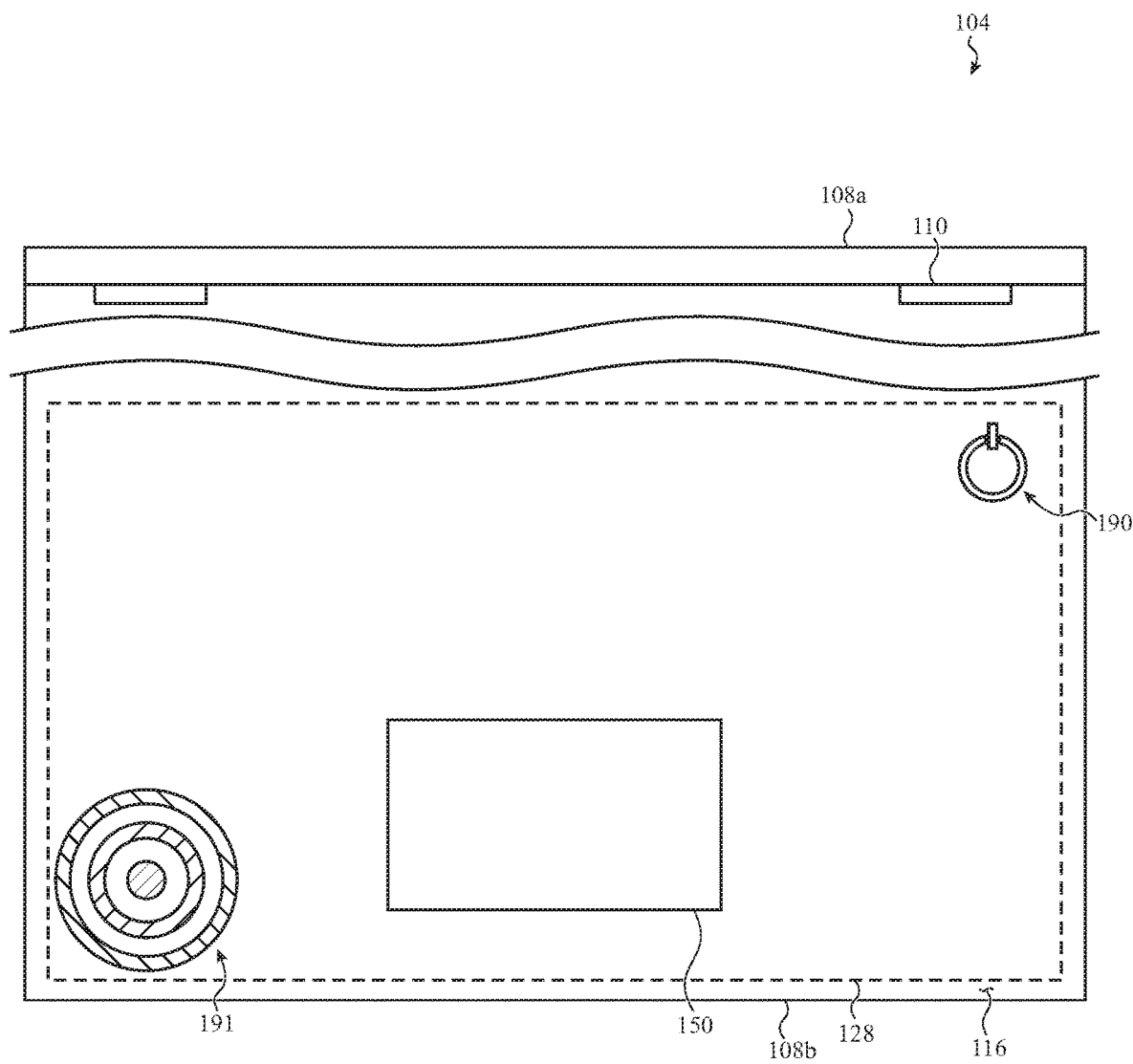
FIG. 7A depicts a top view of a sample electronic device having an active input area and multiple outputs of the electronic device illuminated on the dynamic input region.
Figure 7B:
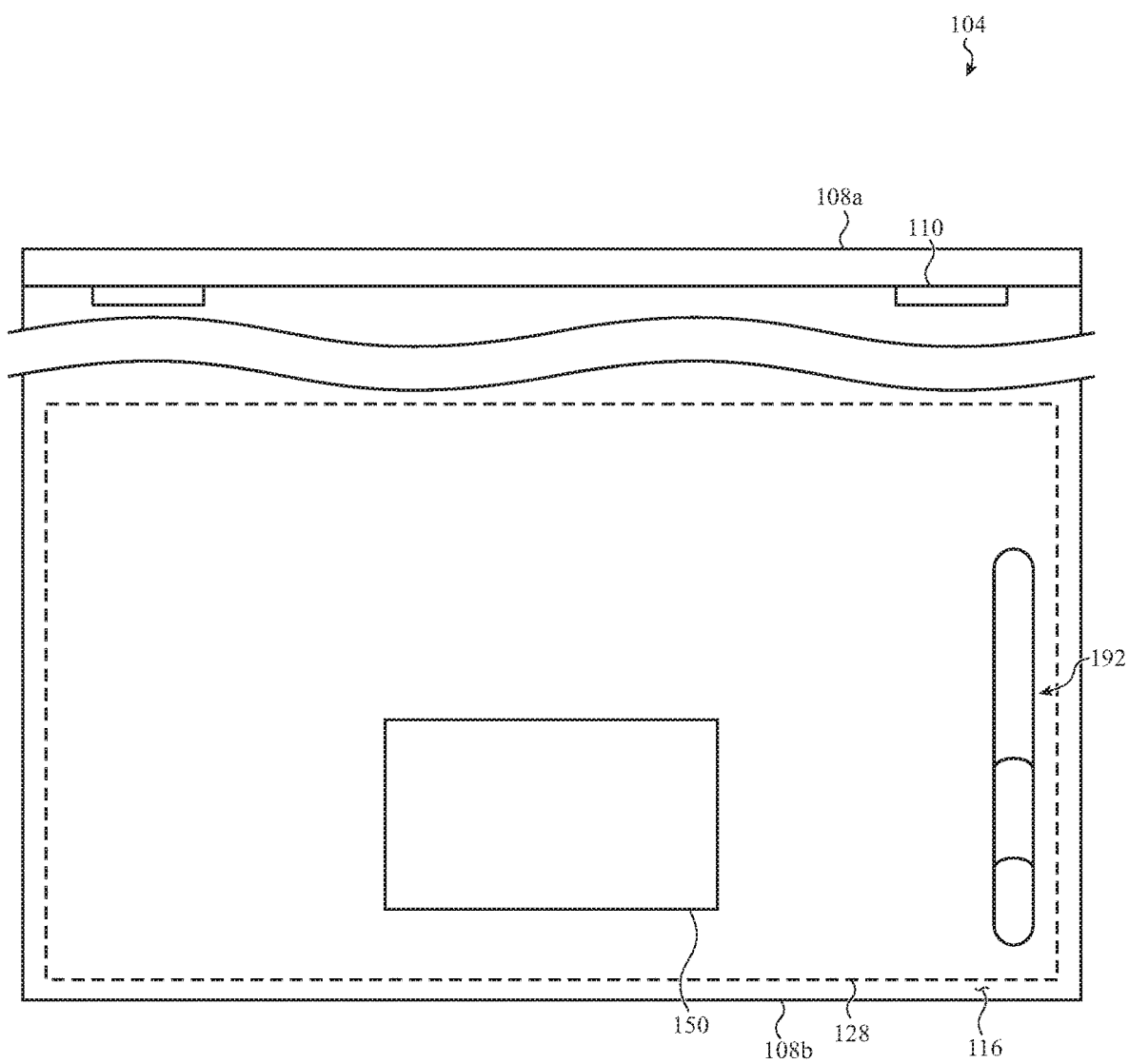
FIG. 7B depicts a top view of a sample electronic device having an active input area and an updateable output of the electronic device illuminated on the dynamic input region.
Figure 7C:
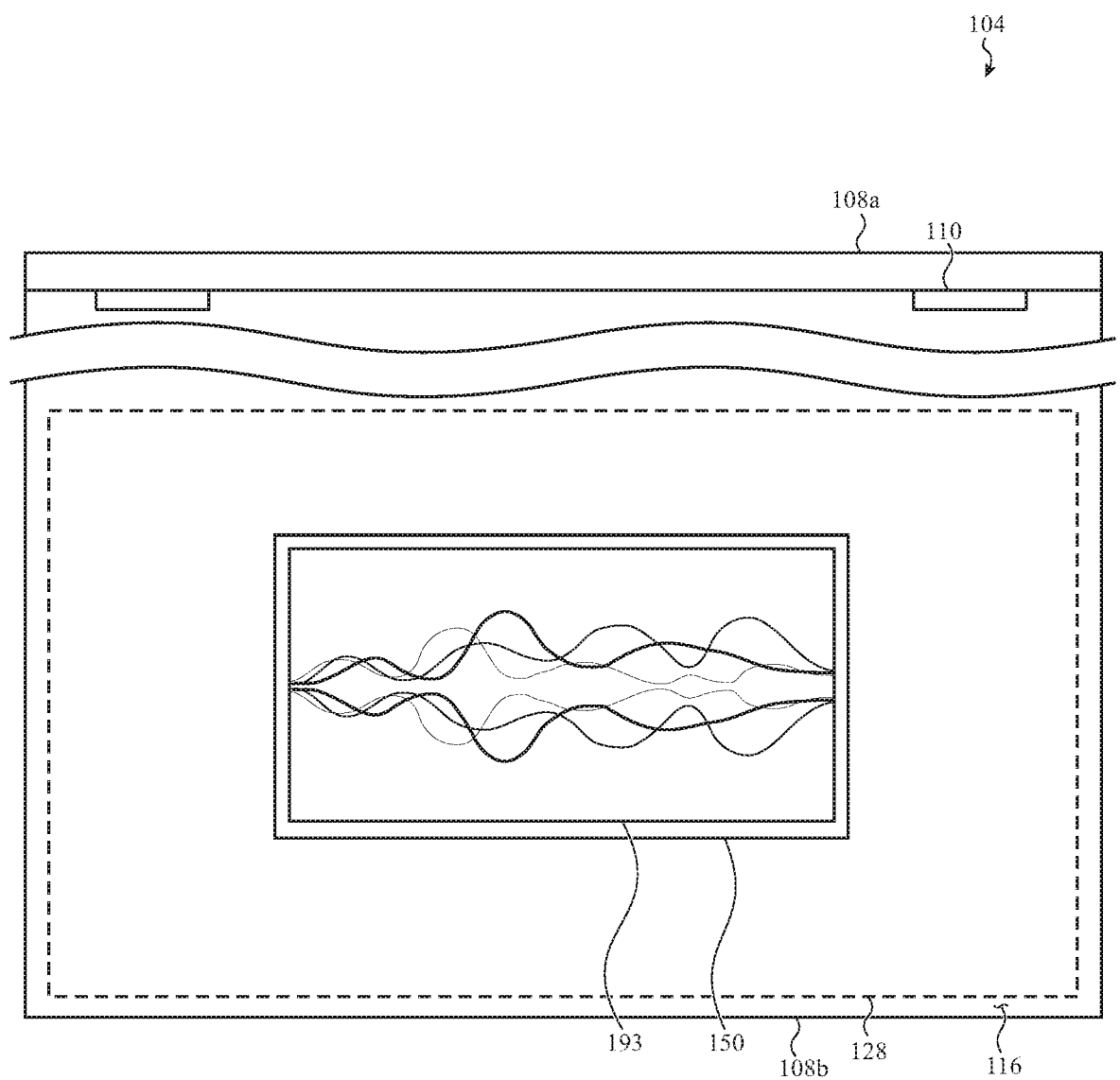
FIG. 7C depicts a top view of a sample electronic device having an active input area and a dynamic output of the electronic device illuminated on the dynamic input region.

FIGS. 7A-7C show various visual outputs depicted with the dynamic input region 128 that may be used to convey information relating to a status of notification from the electronic device 104. The visual outputs may be static, updateable, or dynamic, as may be appropriate for a given application. In some cases, the visual outputs may be associated with an area of the dynamic input region 128 configured to receive an input (e.g., such as where the visual output depicts a power button on the translucent layer 116). In other cases, the visual outputs are not associated with an input functionality, but rather are used to convey information or a notification to a user.

With reference to FIG. 7A, multiple visual outputs are shown illuminated on the translucent layer 116. These may be substantially static outputs of the electronic device 104. In particular, a visual output 190 and a visual output 191 may be illuminated on the translucent layer 116. The visual output 190 may correspond to a power button or symbol. The visual output 190 may thus be configured to receive an input along the dynamic input region 128 and control a function of the electronic device 104 (e.g., such as switching the power between an off, on, stand-by, and/or other mode). The visual output 191 may correspond to a location of a component or assembly within the electronic device 104. For example, the visual output 191 may be a symbol that shows the location of an inductive power coil or other internal charging system of the electronic device 104. This may allow the electronic device 104, for example, to be substantially free of markings or other permanent indicia relating to the charging assembly, as the visual output 191 may appear on the translucent layer 116 only when illuminated.

With reference to FIG. 7B, the dynamic input region 128 is shown with a visual output 192 illuminated on the translucent layer 116. The visual output 192 may convey updateable information to the user related to a status or condition of the electronic device 104. In the embodiment illustrated in FIG. 7B, the visual output 192 may be a symbol corresponding to a battery depletion level of the electronic device 104. The visual output 192 may be illuminated, for example, along a periphery of the translucent layer 116. This may allow a user to view the visual output 192 (and determine the corresponding battery depletion level), when the electronic device 104 is in a closed configuration. The symbol corresponding to a battery depletion level of the electronic device 104 is shown in FIG. 7B for purposes of illustration only; in other cases, other symbols are possible and are described herein.

With reference to FIG. 7C, the dynamic input region 128 is shown with a visual output 193 illuminated on the translucent layer 116. The visual output 193 may be a dynamic output of the electronic device 104. For example, the visual output 193 may depict moveable symbols or other dynamically updateable information. In one embodiment, the visual output 193 may be illuminated in response to a voice activated input. For example, the electronic device 104 may be configured to receive a voice prompt that causes the electronic device 104 to be momentarily controlled by voice commands. During the period in which the electronic device 104 may be momentarily controlled by voice commands, or during other periods, the visual output 193 may appear within the dynamic input region 128. The visual output 193 is shown in FIG. 7C having dynamic sinusoidal lines (which may move or vibrate as the electronic device 104 is momentarily controlled by voice commands). However, in other embodiments, other substantially dynamic visual outputs of the electronic device 104 are possible.

Figure 8A:
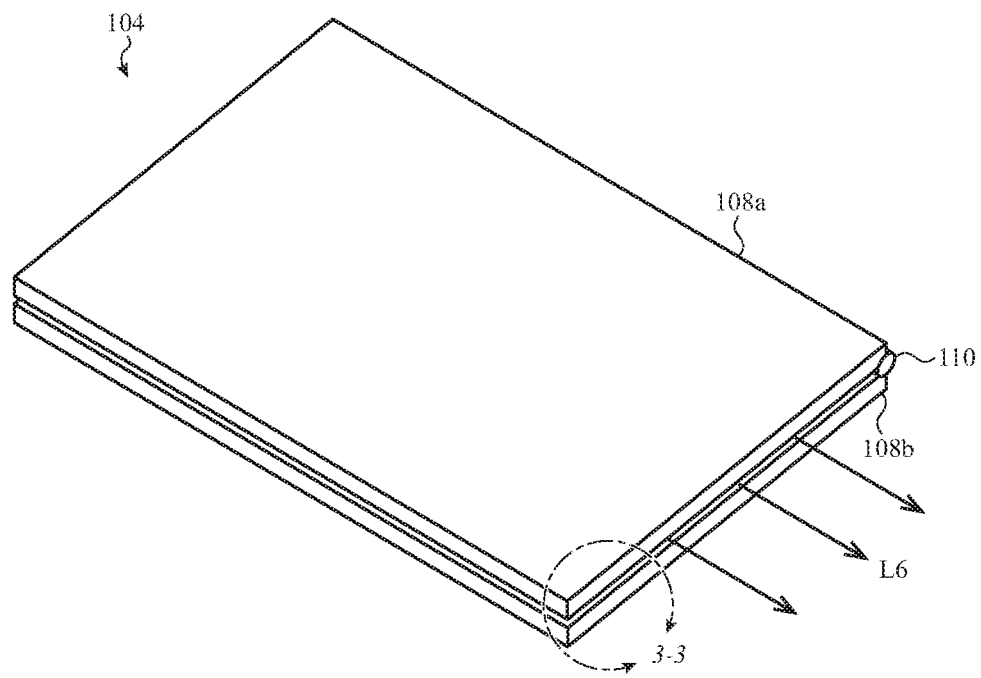
FIG. 8A depicts a sample electronic device having a visual output visible between an upper portion and a lower position of the device arranged in a closed position.
Figure 8B:
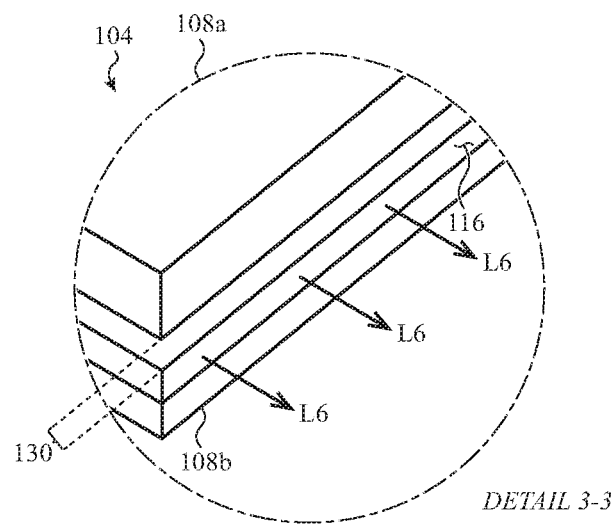
FIG. 8B depicts a sample electronic device having an active input area defined on a dynamic input region when an upper portion and a lower portion of the device are arranged in a closed position.

FIGS. 8A and 8B depict various embodiments of the illumination of the translucent layer 116 when the electronic device 104 is in a closed configuration. As described herein, in the closed configuration, the upper enclosure 108a and the lower enclosure 108b may be aligned or positioned substantially parallel to one another. In the closed configuration, the upper enclosure 108a and the lower enclosure 108b may be separated by a gap 130. Various active input areas, visual outputs, and so on may be illuminated on the translucent layer 116 when the electronic device 104 is in the closed configuration. The illumination of the translucent layer 116 may thus be visually perceptible to the user, which may allow the user to receive information relating to the electronic device 104 and/or apply an input notwithstanding the electronic device 104 being in the closed configuration.

With reference to FIG. 8A, a light path L6 is shown being emitted from the electronic device 104. For example, as described with respect to FIG. 2F, the light path L6 may be emitted through the gap 130 when the electronic device 104 is in a closed configuration. The light path L6 may be representative of visually perceptive light caused by an illumination of an active input area or visual output illuminated on the translucent layer 116.

With reference to FIG. 8B, a light path L7 is shown being emitted from an end or side of the translucent layer 116. For example, as described with respect to FIG. 2F, the light path L7 may be emitted from the end or side of the translucent layer 116 when the electronic device 104 is in a closed configuration. In some cases, light propagated along the light path L7 may be used to define a dynamic input region and/or an active input area, as may be appropriate for a given application.

FIGS. 9A-11 depict various electronic devices having a dynamic input region. Broadly, the dynamic input region may be formed on any external surface of an electronic device formed from a translucent layer. This may be a device enclosure, case, cover, panel, display, masking area, or other surface of an electronic device. The translucent layer may be illuminated to reveal input functionality of the dynamic input region. For example, an active input area, visual output, or other optical effect may be illuminated on the external surface. Various sensing elements, haptic structures, light-emitting elements, and/or other appropriate components or assemblies, described herein, may be positioned within the electronic device and configured to detect input along the dynamic input region.

Figure 9A:
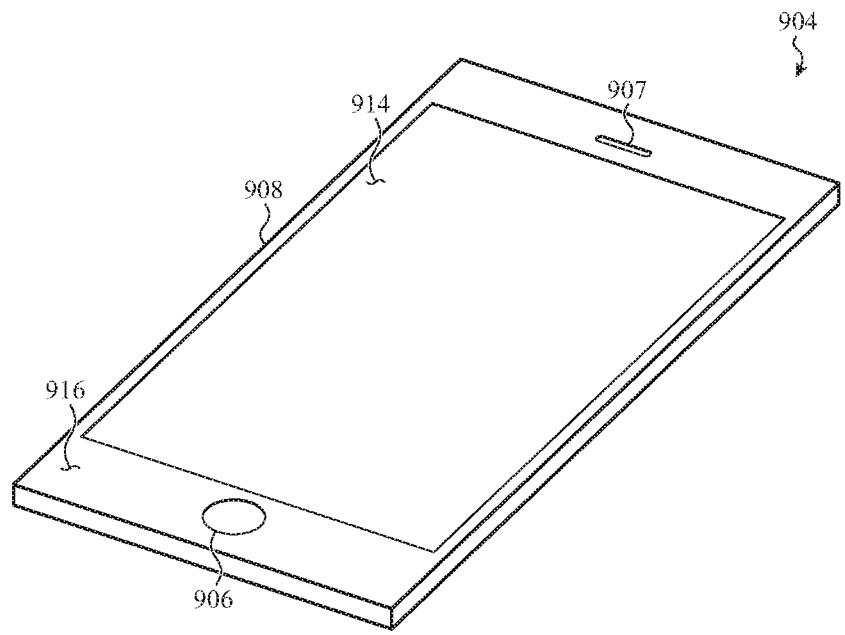
FIG. 9A depicts a sample portable electronic device.

FIG. 9A depicts an electronic device 904. The electronic device 904 may be a mobile phone. For purposes of illustration, the electronic device 904 is shown as having an enclosure 908, a touch-sensitive display 914, a translucent layer 916, one or more input/output members 906, and a speaker 907. It should be noted that the electronic device may also include various other components, such as one or more ports (e.g., charging ports, data transfer ports, or the like), additional input/output buttons, and so on. As such, the discussion of any electronic device, such as electronic device 904 is meant as illustrative only.

Figure 9B:
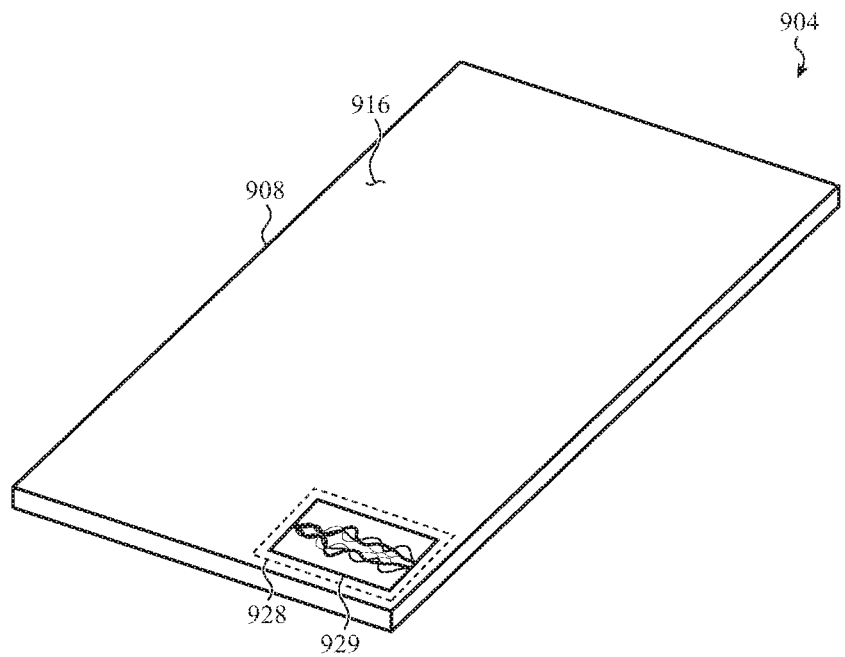
FIG. 9B depicts a rear surface of the sample portable electronic device of FIG. 9A having a dynamic input region.

FIG. 9B depicts a bottom surface of the enclosure 908 of the electronic device 904. The electronic device 904 may include a translucent layer 916 that forms the bottom surface of the enclosure 908. As shown in FIG. 9B, the electronic device 904 may include a dynamic input region 928. The dynamic input region 928 may be configured to detect an input used to control a function of the electronic device 904. Accordingly, it will be appreciated that the dynamic input region 928 may be substantially analogous to the dynamic input region 128 described above. For example, electronic device 904 may include various sensing elements, light-emitting elements, haptic structures, and/or other components or assemblies configured to illuminate the translucent layer 916 at the dynamic input region 128 and detect an input. As shown in the embodiment of FIG. 9B, a visual output 929 may be illuminated on the translucent layer 916 at the dynamic input region 928.

Figure 10:
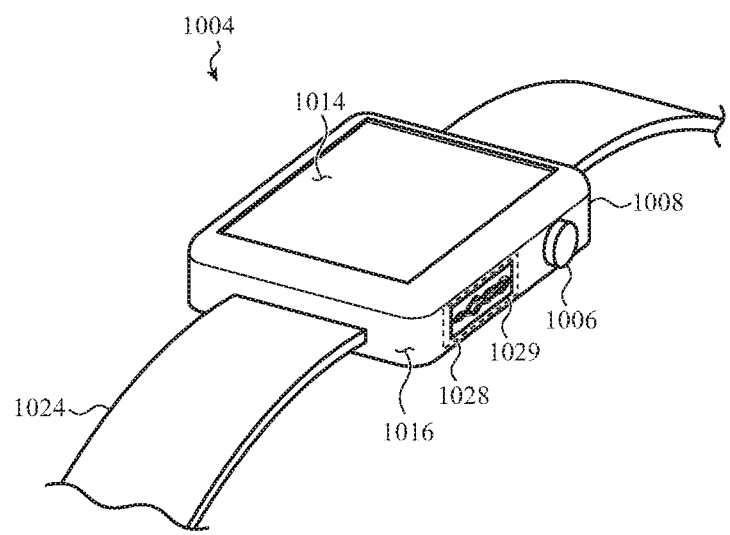
FIG. 10 depicts a sample watch having a dynamic input region.

FIG. 10 depicts an electronic device 1004. The electronic device 1004 may be a watch or other portable wearable electronic device. For purposes of illustration, the watch is shown as having an enclosure 1008, a crown 1006, a touch-sensitive display 1014, and a band 1024. The touch-sensitive display 1014 may be positioned in a first opening defined by the enclosure 1008 and the crown 1006 may be at least partially positioned in a second opening defined by the enclosure 1008. The touch-sensitive display 1014 may be responsive to translation and rotational movement of the crown 1006. For example, a visual output of the touch-sensitive display 1014 may be modified in a first manner in response to rotational movement of the crown 1006 and in a second manner in response to translational movement of the crown 1006. It should be noted that the electronic device 1004 may also include various other components, such as one or more ports (e.g., charging ports, data transfer ports, or the like), additional input/output buttons, and so on. As such, the discussion of any electronic device, such as electronic device 1004, is meant as illustrative only.

The electronic device 1004 may include a translucent layer 1016 that forms an exterior surface of the enclosure 1008. As shown in FIG. 10, the electronic device 1004 may include a dynamic input region 1028. The dynamic input region 1028 may be configured to detect an input used to control a function of the electronic device 1004. Accordingly, it will be appreciated that the dynamic input region 1028 may be substantially analogous to the dynamic input region 128 described above. For example, electronic device 1004 may include various sensing elements, light-emitting elements, haptic structures, and/or other components or assemblies configured to illuminate the translucent layer 1016 at the dynamic input region 1028 and detect an input. As shown in the embodiment of FIG. 10, a visual output 1029 may be illuminated on the translucent layer 1016 at the dynamic input region 1028.

Figure 11:
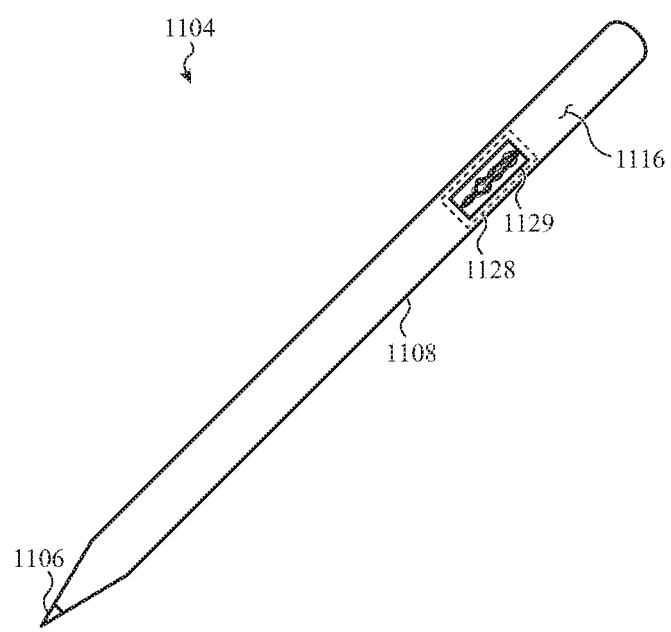
FIG. 11 depicts a sample stylus having an input region.

FIG. 11 depicts an electronic device 1104. The electronic device 1104 may be a stylus. The stylus may be used to provide input to an associated electronic device, such as a tablet or smart phone, for example, through interaction with a touch-sensitive surface of the associated electronic device. For purposes of illustration, the electronic device 1104 is shown as having an enclosure 1108 and a tip 1106. A user may manipulate the enclosure 1108 to provide information to the associated electronic device, for example, by moving the tip 1106 relative to a touch-sensitive surface of the associated electronic device. It should be noted that the electronic device 1104 may also include various other components, such as one or more ports (e.g., charging ports, data transfer ports, or the like), additional input/output buttons, and so on. As such, the discussion of any electronic device, such as electronic device 1104, is meant as illustrative only.

The electronic device 1104 may include a translucent layer 1116 that forms an exterior surface of the enclosure 1108. As shown in FIG. 11, the electronic device 1104 may include a dynamic input region 1128. The dynamic input region 1128 may be configured to detect an input used to control a function of the electronic device 1104. Accordingly, it will be appreciated that the dynamic input region 1128 may be substantially analogous to the dynamic input region 128 described above. For example, electronic device 1104 may include various sensing elements, light-emitting elements, haptic structures, and/or other components or assemblies configured to illuminate the translucent layer 1116 at the dynamic input region 1128 and detect an input. As shown in the embodiment of FIG. 11, a visual output 1129 may be illuminated on the translucent layer 1116 at the dynamic input region 1128.

Figure 12:
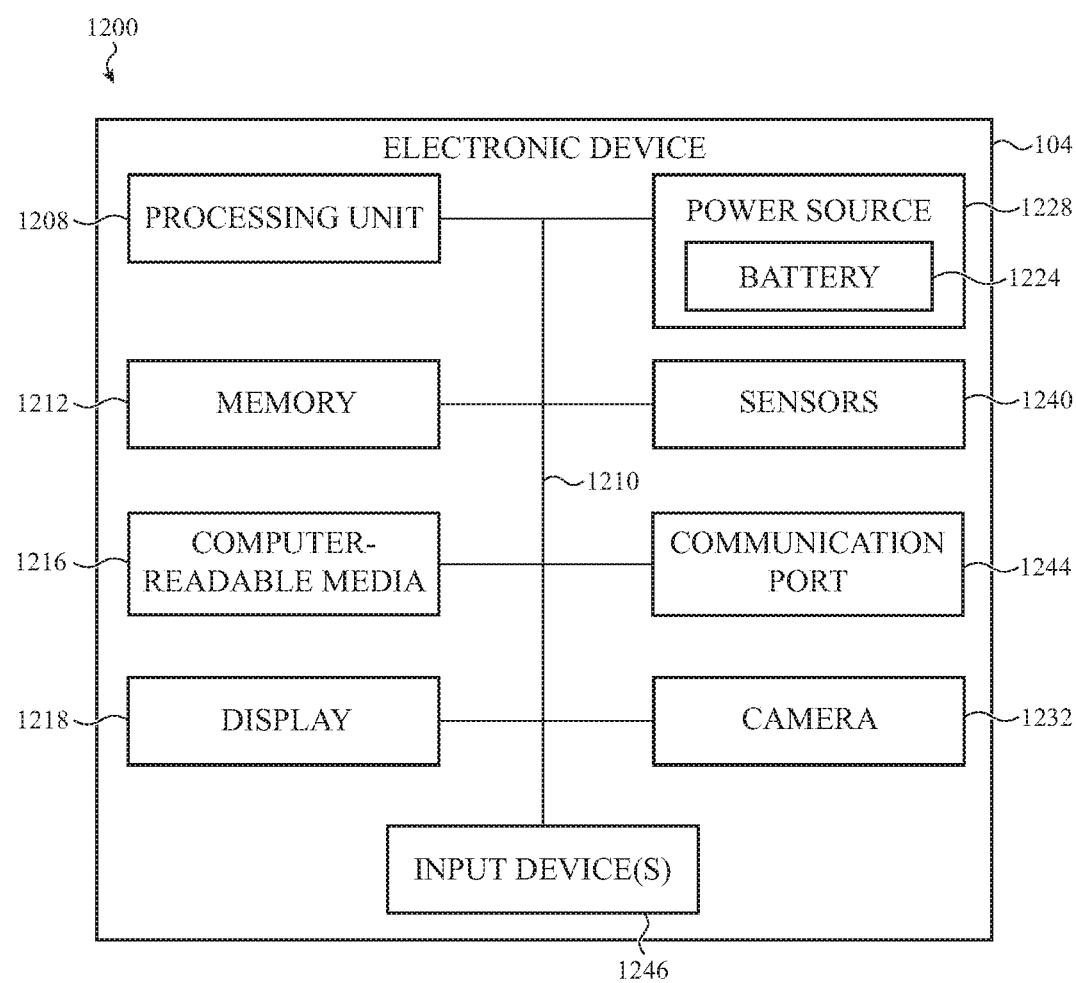
FIG. 12 illustrates a functional block diagram of an electronic device.

FIG. 12 presents a functional block diagram 1200 of a sample electronic device, such as the electronic device 104 described with respect to FIGS. 1A-8B. It will be appreciated, however, that the functional block diagram described herein of electronic device 104 may include components substantially analogous to components of other electronic devices of the like described herein. In this regard, the schematic representation in FIG. 12 may correspond to the electronic device depicted in FIGS. 1A-8B, described above. However, the schematic representation in FIG. 12 may also correspond to the other electronic devices or the like described herein, for example, such as electronic devices 904, 1004, and/or 1104, described with respect to FIGS. 9A-11. The electronic device 104 may include any appropriate hardware (e.g., computing devices, data centers, switches), software (e.g., applications, system programs, engines), network components (e.g., communication paths, interfaces, routers), and the like (not necessarily shown in the interest of clarity) for use in facilitating any appropriate operations disclosed herein.

As shown in FIG. 12, the electronic device 104 may include a processing unit or element 1208 operatively connected to computer memory 1212 and computer-readable media 1216. The processing unit 1208 may be operatively connected to the memory 1212 and computer-readable media 1216 components via an electronic bus or bridge (e.g., such as system bus 1210). The processing unit 1208 may include one or more computer processors or microcontrollers that are configured to perform operations in response to computer-readable instructions. The processing unit 1208 may be a central processing unit of the stylus. Additionally or alternatively, the processing unit 1208 may be other processors within the device including application specific integrated chips (ASIC) and other microcontroller devices.

The memory 1212 may include a variety of types of non-transitory computer-readable storage media, including, for example, read access memory (RAM), read-only memory (ROM), erasable programmable memory (e.g., EPROM and EEPROM), or flash memory. The memory 1212 is configured to store computer-readable instructions, sensor values, and other persistent software elements. Computer-readable media 1216 may also include a variety of types of non-transitory computer-readable storage media, including, for example, a hard-drive storage device, a solid state storage device, a portable magnetic storage device, or other similar device. The computer-readable media 1216 may also be configured to store computer-readable instructions, sensor values, and other persistent software elements.

In this example, the processing unit 1208 is operable to read computer-readable instructions stored on the memory 1212 and/or computer-readable media 1216. The computer-readable instructions may adapt the processing unit 1208 to perform the operations or functions described above with respect to FIGS. 1A-11. The computer-readable instructions may be provided as a computer-program product, software application, or the like. It should be appreciated that, where the electronic device is a stylus, the processing unit 1208 may be located in an electronic device associated with the stylus, rather than the stylus itself. In such embodiments, data may be transmitted from the stylus to and from the electronic device, such that the processing unit in the electronic device may operatively control the stylus.

As shown in FIG. 12, the electronic device 104 may also include a display 1218. The display 1218 may include a liquid-crystal display (LCD), organic light-emitting diode (OLED) display, light-emitting diode (LED) display, or the like. If the display 1218 is an LCD, the display may also include a backlight component that can be controlled to provide variable levels of display brightness. If the display 1218 is an OLED or LED type display, the brightness of the display 1218 may be controlled by modifying the electrical signals that are provided to display elements.

The electronic device 104 may also include a battery 1224 that is configured to provide electrical power to the components of the electronic device 104. The battery 1224 may include one or more power storage cells that are linked together to provide an internal supply of electrical power. In this regard, the battery 1224 may be a component of a power source 1228 (e.g., including a charging system or other circuitry that supplies electrical power to components of the electronic device 104). The battery 1224 may be operatively coupled to power management circuitry that is configured to provide appropriate voltage and power levels for individual components or groups of components within the electronic device 104. The battery 1224, via power management circuitry, may be configured to receive power from an external source, such as an AC power outlet or interconnected computing device. The battery 1224 may store received power so that the electronic device 104 may operate without connection to an external power source for an extended period of time, which may range from several hours to several days.

The electronic device 104 may also include one or more sensors 1240 that may be used to detect a touch and/or force input, environmental condition, orientation, position, or some other aspect of the electronic device 104. For example, sensors 1240 that may be included in the electronic device 104 may include, without limitation, one or more accelerometers, gyrometers, inclinometers, goniometers, or magnetometers. The sensors 1240 may also include one or more proximity sensors, such as a magnetic hall-effect sensor, inductive sensor, capacitive sensor, continuity sensor, or the like.

The sensors 1240 may also be broadly defined to include wireless positioning devices, including, without limitation, global positioning system (GPS) circuitry, Wi-Fi circuitry, cellular communication circuitry, and the like. The electronic device 104 may also include one or more optical sensors, including, without limitation, photodetectors, photo sensors, image sensors, infrared sensors, or the like. In one example, the sensor 1240 may be an image sensor that detects a degree to which an ambient image matches a stored image. As such, the sensor 1240 may be used to identify a user of the electronic device 104. The sensors 1240 may also include one or more acoustic elements, such as a microphone used alone or in combination with a speaker element. The sensors 1240 may also include a temperature sensor, barometer, pressure sensor, altimeter, moisture sensor or other similar environmental sensor. The sensors 1240 may also include a light sensor that detects an ambient light condition of the electronic device 104.

The sensor 1240, either alone or in combination, may generally be a motion sensor that is configured to estimate an orientation, position, and/or movement of the electronic device 104. For example, the sensor 1240 may include one or more motion sensors, including, for example, one or more accelerometers, gyrometers, magnetometers, optical sensors, or the like to detect motion. The sensors 1240 may also be configured to estimate one or more environmental conditions, such as temperature, air pressure, humidity, and so on. The sensors 1240, either alone or in combination with other input, may be configured to estimate a property of a supporting surface, including, without limitation, a material property, surface property, friction property, or the like.

The electronic device 104 may also include a camera 1232 that is configured to capture a digital image or other optical data. The camera 1232 may include a charge-coupled device, complementary metal oxide (CMOS) device, or other device configured to convert light into electrical signals. The camera 1232 may also include one or more light sources, such as a strobe, flash, or other light-emitting device. As discussed above, the camera 1232 may be generally categorized as a sensor for detecting optical conditions and/or objects in the proximity of the electronic device 104. However, the camera 1232 may also be used to create photorealistic images that may be stored in an electronic format, such as JPG, GIF, TIFF, PNG, raw image file, or other similar file types.

The electronic device 104 may also include a communication port 1244 that is configured to transmit and/or receive signals or electrical communications from an external or separate device. The communication port 1244 may be configured to couple to an external device via a cable, adaptor, or other type of electrical connector. In some embodiments, the communication port 1244 may be used to couple the electronic device 104 with a computing device and/or other appropriate accessories configured to send and/or receive electrical signals. The communication port 1244 may be configured to receive identifying information from an external accessory, which may be used to determine a mounting or support configuration. For example, the communication port 1244 may be used to determine that the electronic device 104 is coupled to a mounting accessory, such as a particular type of stand or support structure.

As shown in FIG. 12, the electronic device 104 may also include one or more input devices 1246. The input device 1246 may be, or include, the dynamic input region 128 (and associated elements) described herein. For example, the input device 1246 may be configured to receive an input that is used to control a function of the electronic device 104. Additionally, the input device 1246 may be one or more of a keyboard, mouse, pen, stylus, sound input device, touch input device, or the like.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A notebook computer comprising:
an upper portion comprising a display;
a lower portion pivotally coupled with the upper portion and comprising:
    a keyboard region configured to receive keypress inputs; and
    a dynamic input region along a side of the keyboard region, the dynamic input region defined at least in part by:
        a stack of translucent layers comprising:
            a first translucent layer defining an exterior surface and comprising first light-extraction features; and
            a second translucent layer positioned below the first translucent layer and comprising second light-extraction features;
        a first light-emitting element configured to propagate light through the first translucent layer to the first light-extraction features to illuminate a first active input area; and
        a second light-emitting element configured to propagate light through the second translucent layer to the second light-extraction features to illuminate a second active input area; and
a processor configured to:
    in a first mode of operation, control the first light-emitting element to illuminate the first active input area via the first light-extraction features; and
    in a second mode of operation, control the second light-emitting element to illuminate the second active input area via the second light-extraction features, wherein:
        the first active input area has a first size; and
        the second active input area has a second size, the second size smaller than the first size.

2. The notebook computer of claim 1, wherein the keyboard region comprises a set of illuminable key caps that extend through the lower portion.

3. The notebook computer of claim 1, wherein:
the first active input area overlaps with a portion of the second active input area, thereby defining:
    an overlapping portion of the dynamic input region in which the first active input area overlaps with the second active input area; and
    a non-overlapping portion of the dynamic input region in which the first active input area does not overlap with the second active input area;
the overlapping portion of the dynamic input region defines a center region of the dynamic input region; and
the non-overlapping portion of the dynamic input region defines a periphery of the dynamic input region.

4. The notebook computer of claim 3, wherein:
the overlapping portion is illuminated by:
    the first light-emitting element via the first light-extraction features; and
    the second light-emitting element via the second light extraction features;

the non-overlapping portion is illuminated by the first light-emitting element via the first light-extractions features; and the first light-emitting element and the second light-emitting element are selectively illuminable.

5. The notebook computer of claim 4, wherein the second light-emitting element illuminates the second light-extraction features after the first light-emitting element illuminates the first light-extraction features to display an activation of the non-overlapping portion within the dynamic input region.

6. The notebook computer of claim 3, wherein a first intensity of light emitted from the overlapping portion is higher than a second intensity of light emitted from the non-overlapping portion.

7. The notebook computer of claim 1, wherein:
the stack of translucent layers further comprises a third translucent layer positioned below the second translucent layer and comprising third light-extraction features; and
the lower portion further comprises a third light-emitting element configured to propagate light through the third translucent layer to the third light-extraction features to illuminate a third active input area, the third active input area different from the first active input area and from the second active input area.

8. The notebook computer of claim 7, wherein:
a portion of the second active input area extends around a periphery of the third active input area; and
the first active input area, the second active input area, and the third active input area are selectively illuminable.

9. An electronic device comprising:
an upper portion comprising a display; and
a lower portion pivotally coupled with the upper portion and comprising:
    a first translucent layer defining an external surface of the electronic device and comprising first light-extraction features defining a first input area;
    a second translucent layer positioned below the first translucent layer and comprising second light-extraction features defining a second input area, the second input area smaller than the first input area;
    a first light-emitting element optically coupled with the first translucent layer along a first side of the first translucent layer and configured to direct light through the first translucent layer to illuminate the first input area;
    a second light-emitting element optically coupled with the second translucent layer along a second side of the second translucent layer and configured to direct light through the second translucent layer to illuminate the second input area; and
    a processing unit configured to:
        in a first mode of operation, illuminate the first input area; and
        in a second mode of operation, illuminate the second input area, wherein:
a portion of the first input area extends around a periphery of the second input area; and
the second input area is illuminated both by the first light-emitting element and the second light-emitting element.

10. The electronic device of claim 9, wherein:
the first translucent layer comprises a first internal reflection region positioned between the first light-emitting element and the first light-extraction features and configured to channel light from the first light-emitting element to the first light-extraction features; and
the second translucent layer comprises a second internal reflection region positioned between the second light-emitting element and the second light-extraction features and configured to channel light from the second light-emitting element to the second light-extraction features.

11. The electronic device of claim 9, wherein:
in the first mode of operation, the second input area is unilluminated; and
in the second mode of operation, both the second input area and the first input area are illuminated.

12. The electronic device of claim 9, further comprising:
a third translucent layer positioned below the second translucent layer and comprising third light-extraction features defining a third input area; and
a third light-emitting element optically coupled with the third translucent layer along a third side of the third translucent layer and configured to direct light through the third translucent layer to illuminate the third input area.

13. The electronic device of claim 12, wherein:
a portion of the first input area extends around a periphery of the second input area;
a portion of the second input area extends around a periphery of the third input area; and
the third input area is illuminated by the first light-emitting element, the second light-emitting element, and the third light-emitting element.

14. The electronic device of claim 12, wherein the processing unit is further configured to, in a third mode of operation, illuminate the third input area.

15. The electronic device of claim 14, wherein the processing unit operates the first light-emitting element, the second light-emitting element, and the third light-emitting element in sequence to display a transition between the first mode of operation, the second mode of operation, and the third mode of operation.

16. An electronic device comprising:
an enclosure;
a display positioned at least partially within the enclosure;
a keyboard coupled to the enclosure and along a side of the display;
a plurality of translucent layers defining a dynamic input region positioned along a side of the keyboard and comprising:
    a stack of translucent layers comprising:
        a first translucent layer comprising first light-extraction features;
        a second translucent layer comprising second light-extraction features; and
        a third translucent layer comprising third light-extraction features;
    a first light-emitting element configured to illuminate the first light-extraction features;
    a second light-emitting element configured to illuminate the second light-extraction features; and
    a third light-emitting element configured to illuminate the third light-extraction features; and
a processor configured to:
    in a first mode of operation, control the first light-emitting element to illuminate the first light-extraction features;
    in a second mode of operation, control the second light-emitting element to illuminate the second light-extraction features; and in a third mode of operation, control the third light-emitting element to illuminate the third light-extraction features, wherein:
the dynamic input region has a first size in the first mode of operation;
the dynamic input region has a second size in the second mode of operation, the second size larger than the first size; and
the dynamic input region has a third size in the third mode of operation, the third size larger than the second size.

17. The electronic device of claim 16, wherein the processor transitions between the first mode, the second mode, and the third mode as a size of the dynamic input region changes.

18. The electronic device of claim 16, further comprising a sensing element positioned within the enclosure and configured to detect a user input within the dynamic input region.

* * * * *